(12) United States Patent
Huang et al.

(10) Patent No.: US 8,107,561 B2
(45) Date of Patent: Jan. 31, 2012

(54) METHOD AND APPARATUS FOR CARRIER FREQUENCY OFFSET ESTIMATION AND FRAME SYNCHRONIZATION IN A WIRELESS COMMUNICATION SYSTEM

(75) Inventors: Yuheng Huang, San Diego, CA (US);
Ozgur Dural, San Diego, CA (US);
Samir S. Soliman, San Diego, CA (US);
Amol Rajkotia, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 862 days.

(21) Appl. No.: 11/924,609

(22) Filed: Oct. 26, 2007

(65) Prior Publication Data

US 2008/0101520 A1 May 1, 2008

Related U.S. Application Data

(60) Provisional application No. 60/854,877, filed on Oct. 26, 2006.

(51) Int. Cl.
*H04L 27/00* (2006.01)
(52) U.S. Cl. ........ 375/326; 375/344; 375/354; 375/366; 375/367; 375/368
(58) Field of Classification Search .................. 375/326, 375/344, 354, 366–368
See application file for complete search history.

(56) References Cited

U.S. PATENT DOCUMENTS

| | | | |
|---|---|---|---|
| 4,653,076 A * | 3/1987 | Jerrim et al. ................ | 375/367 |
| 6,108,353 A | 8/2000 | Nakamura et al. | |
| 6,144,696 A | 11/2000 | Shively et al. | |
| 6,317,470 B1 | 11/2001 | Kroeger et al. | |
| 6,519,276 B1 | 2/2003 | Kim et al. | |
| 6,751,444 B1 | 6/2004 | Meiyappan | |
| 7,062,282 B2 | 6/2006 | Liu et al. | |
| 7,116,734 B1 | 10/2006 | Nergis | |
| 7,356,105 B1 * | 4/2008 | Nergis ......................... | 375/346 |

(Continued)

FOREIGN PATENT DOCUMENTS

EP 1398927 3/2004

(Continued)

OTHER PUBLICATIONS

Davis M E et al. "Improved CDMA Performance Through Multiple Access Noise Rejection" Military Communications Conference, 1992. Milcom '92, Conference Record. Communications-Fusing Command, Control and Intelligence., IEEE San Diego, CA, USA Oct. 11-14, 1992, New York, NY, USA, IEEE, US, (Oct. 11, 1992), pp. 846-850.

(Continued)

*Primary Examiner* — Curtis B Odom
(74) *Attorney, Agent, or Firm* — QUALCOMM Patent Group; Jonathan T. Velasco; James H. Yancey, Jr.

(57) ABSTRACT

A method for performing carrier frequency offset estimation and frame synchronization is disclosed herein. In one approach, the method includes performing a first level frequency discrimination on at least one estimated channel tap to generate a frequency discriminated value; estimating a phase error from the frequency discriminated value; and, determining a predetermined frame synchronization pattern from the estimated phase error. A computer program product having code and a wireless communications apparatus for performing the method are also described herein.

20 Claims, 26 Drawing Sheets

U.S. PATENT DOCUMENTS

| | | | |
|---|---|---|---|
| 7,593,378 | B1 | 9/2009 | Murali et al. |
| 7,693,210 | B2 | 4/2010 | Margetts et al. |
| 2004/0081205 | A1 | 4/2004 | Coulson |
| 2004/0161046 | A1 | 8/2004 | Schott et al. |
| 2005/0190817 | A1 | 9/2005 | Batra et al. |
| 2005/0232342 | A1 | 10/2005 | Batra et al. |
| 2005/0249268 | A1 | 11/2005 | Batra et al. |
| 2006/0014508 | A1 | 1/2006 | Seneschal et al. |
| 2006/0104332 | A1 | 5/2006 | Deng et al. |
| 2006/0280273 | A1* | 12/2006 | Mueller-Weinfurtner .... 375/368 |
| 2006/0285478 | A1* | 12/2006 | Gaikwad et al. .............. 370/203 |
| 2007/0014271 | A1 | 1/2007 | Lai |
| 2007/0153717 | A1 | 7/2007 | Tervonen et al. |
| 2008/0019467 | A1 | 1/2008 | He |

FOREIGN PATENT DOCUMENTS

| | | |
|---|---|---|
| EP | 1662736 | 5/2006 |
| RU | 2195772 | 12/2002 |
| RU | 2199184 | 2/2003 |
| RU | 2202855 | 4/2003 |
| RU | 2234198 | 8/2004 |
| RU | 2241312 | 11/2004 |
| RU | 2250564 | 4/2005 |
| TW | I231132 | 4/2005 |
| TW | I233739 | 6/2005 |
| TW | I241102 | 10/2005 |
| TW | I241797 | 10/2005 |
| WO | WO9815070 | 4/1998 |
| WO | WO9941854 | 8/1999 |
| WO | WO0101596 | 1/2001 |
| WO | WO2005029722 A1 | 3/2005 |
| WO | 05069190 | 7/2005 |

OTHER PUBLICATIONS

Written Opinion-PCT/US2007/082736, International Search Authority-Euorpean Patent Office-Feb. 22, 2008.

Liu, et al., "Performance of asynchronous multicarrier cdma multiuser receiver over frequency selective multipath fading channels," Personal, Indoor and Mobile Radio Communications, 2003. PIMRC 2003. 14th IEEE Proceedings on Sep. 7-10, 2003, Piscataway, NJ, USA, IEEE, vol. 2, pp. 1536-1540, XP010679389.

Berger, et al.: "Precise Timing for Multiband OFDM in a UWB System," The 2006 IEEE 2006 International Conference on Ultra-Wideband, pp. 269-274, XP031007147, ISBN: 1-4244-0101-1, Sep. 2006.

Yak, et al.: "Timing Synchronization and Frequency Offset Estimation for Ultra-Wideband (UWB) Multi-Band OFDM Systems," IEEE 16th International Symposium on Personal, Indoor and Mobile Radio Communications, 2005. PIMRC 2005, vol. 1, pp. 471-475, ISBN: 978-3-8007-29, Sep. 11-14, 2005.

Yoon, et al.: "Packet Detection and Symbol Timing Synchronization Algorithm for Multi-Band OFDM UWB," IEICE Transactions on Communications, vol. E89-B, No. 4, pp. 1433-1435, XP-001243306, ISSN: 0916-8516, Apr. 2006.

International Search Report-PCT/US2007/082736, International Searching Authority-European Patent Office-Feb. 22, 2008.

"ECMA-368: High Rate Ultra Wideband PHY and MAC Standard", Dec. 2005, ECMA International, Geneva, Switzerland.

Meel, "Spread Spectrum (SS) Introduction", Studiedaag Spread Spectrum Oct. 6, 1999 (Hogenschool Voor Wetenschap & Kunst-De Nayer Instituti) pp. 1-33.

Hsieh, et al.: "A Low-Complexity Frame Synchronization and Frequency Offset Compensation Scheme for OFDM Systems Over Fading Channels," IEEE Transactions on Vehicular Technology, vol. 48, Issue 5, pp. 1596-1609, XP000912529, ISSN: 0018-9545, Sep. 1999.

Lingwood S D et al: "ASIC implementation of a direct-sequence spread-spectrum Rake-receiver", Vehicular Technology Conference, 1994 IEEE 44TH Stockholm, Sweden Jun. 8-10, 1994, New York, NY, USA, IEEE, Jun. 8, 1994, pp. 1326-1330, XP010123293, DOI: DOI:10.1109/VETEC.1994.345309 ISBN: 978-0-7803-1927-1.

Schotten H D et al: "Iterative construction of sequences with low crosscorrelation values", Proceedings Of The International Conference On Communications (ICC). Geneva, May 23-26,1993; [Proceedings Of The International Conference On Communications (ICC)], New York, IEEE, US, vol. 1, May 23, 1993, pp. 156-160, XP010136885, DOI: DOI:10.1109/ICC. 1993.397248 ISBN: 978-0-7803-0950-0.

Taiwan Search Report—TW096140501—TIPO—May 5, 2011.

Translation of Office Action in Russian Application 2009119732 corresponding to U.S. Appl. No. 11/924,606, citing Yoo et al., RU2199184, RU2241312, RU2250564, US6108353 and US6317470 dated Jan. 27, 2011.

Translation of Office Action in Russian Application 2009119743 corresponding to U.S. Appl. No. 11/924,609, citing RU2195772, US20040014480, US6751444 and US6144696 dated Feb. 18, 2011.

Translation of Office Action in Russian Application 2009119752 corresponding to U.S. Appl. No. 11/924,610, citing US20050232342, RU2202855, RU2234198, EP1398927 and WO2005069190 dated Mar. 17, 2011.

* cited by examiner

DAA = Detect and Avoid

METHOD AND APPARATUS FOR CARRIER FREQUENCY OFFSET ESTIMATION AND FRAME SYNCHRONIZATION IN A WIRELESS COMMUNICATION SYSTEM

CLAIM OF PRIORITY UNDER 35 U.S.C. §119

The present Application for Patent claims priority to Provisional Application No. 60/854,877, entitled "Signal Acquisition" filed Oct. 26, 2006, and assigned to the assignee hereof and hereby expressly incorporated by reference herein.

REFERENCE TO CO-PENDING APPLICATIONS FOR PATENT

The present Application for Patent is related to the following co-pending U.S. Patent Applications:

"Method and Apparatus for Packet Detection in a Wireless Communications System" having 11/924,610, filed concurrently herewith, assigned to the assignee hereof, and expressly incorporated by reference herein.

"Method and Apparatus for Timing Estimation in a Wireless Communications System" having 11/924,606, filed concurrently herewith, assigned to the assignee hereof, and expressly incorporated by reference herein.

BACKGROUND

1. Field

The present disclosed systems relates generally to a system for signal acquisition in a wireless communication system, and, more specifically, to a method and apparatus for carrier frequency offset estimation and frame synchronization in a wireless communications system.

2. Background

Wireless networking systems have become a prevalent means by which a large number of people worldwide communicate. Wireless communication devices have become smaller and more powerful to meet consumer needs, which include improved portability and convenience. Users have found many uses for wireless communication devices, such as cellular telephones, personal digital assistants (PDAs), notebooks, and the like, and such users demand reliable service and expanded coverage areas.

Wireless communications networks are commonly utilized to communicate information regardless of where a user is located (inside or outside a structure) and whether a user is stationary or moving (e.g., in a vehicle, walking). Generally, wireless communications networks are established through a mobile device communicating with a base station or access point. The access point covers a geographic region or cell and, as the mobile device is operated, it may move in and out of these geographic cells. To achieve uninterrupted communication the mobile device is assigned resources of a cell it has entered and de-assigned resources of a cell it has exited.

A network can also be constructed utilizing solely peer-to-peer communication without utilizing access points. In further embodiments, the network can include both access points (infrastructure mode) and peer-to-peer communication. These types of networks are referred to as ad hoc networks). Ad hoc networks can be self-configuring whereby when a mobile device (or access point) receives communication from another mobile device, the other mobile device is added to the network. As the mobile devices leave the area, they are dynamically removed from the network. Thus, the topography of the network can be constantly changing. In a multihop topology, a transmission is transferred though a number of hops or segments, rather than directly from a sender to a recipient.

Ultra-wideband technology such as the WiMedia ultra-wideband (UWB) common radio platform has the inherent capability to optimize wireless connectivity between multimedia devices within a wireless personal area network (WPAN). The goals of the wireless standard is to fulfill requirements such as low cost, low power consumption, small-form factor, high bandwidth and multimedia quality of service (QoS) support.

The WiMedia UWB common radio platform presents a distributed medium-access technique that provides a solution to operating different wireless applications in the same network. The WiMedia UWB common radio platform incorporates media access control (MAC) layer and physical (PHY) layer specifications based on multi-band orthogonal frequency-division multiplexing (MB-OFDM). The WiMedia MAC and PHY specifications are intentionally designed to adapt to various requirements set by global regulatory bodies. Manufacturers needing to meet regulations in various countries can thus do so easily and cost-effectively. Some other application-friendly features that WiMedia UWB attempts to implement include the reduced level of complexity per node, long battery life, support of multiple power management modes and higher spatial capacity.

WiMedia UWB-compliant receivers have to cope with interference from existing wireless services while providing large bandwidth. At the same time, they have to perform with very low transmit power. One challenge faced by receivers in an operational environment is the acquisition of a signal and, as a part thereof, estimating carrier frequency offset and frame detection of the frames in the transmitted signal.

There is therefore a need in the art for meeting the challenges noted above.

SUMMARY

The presently described approaches are directed to carrier frequency offset estimation and frame synchronization. In one approach, a method is described for performing a combined carrier frequency offset estimation and frame synchronization including performing a first level frequency discrimination on at least one estimated channel tap to generate a frequency discriminated value; estimating a phase error from the frequency discriminated value; and, determining a predetermined frame synchronization pattern from the estimated phase error.

In another approach, an apparatus is described for performing a combined carrier frequency offset estimation and frame synchronization, including means for performing a first level frequency discrimination on at least one estimated channel tap to generate a frequency discriminated value; means for estimating a phase error from the frequency discriminated value; and, means for determining a predetermined frame synchronization pattern from the estimated phase error.

In still another approach, a wireless communications apparatus is described. The remote station apparatus includes an antenna; a receiver coupled to the antenna, the receiver having a circuit configured to perform a method for performing a combined carrier frequency offset estimation and frame synchronization, the method including performing a first level frequency discrimination on at least one estimated channel tap to generate a frequency discriminated value; estimating a phase error from the frequency discriminated value; and, determining a predetermined frame synchronization pattern from the estimated phase error.

In still yet another approach, a computer program product is described. The computer program product includes computer-readable medium having code for causing a computer to perform a first level frequency discrimination on at least one estimated channel tap to generate a frequency discriminated value; code for causing the computer to estimate a phase error from the frequency discriminated value; and, code for causing the computer to determine a predetermined frame synchronization pattern from the estimated phase error.

DETAILED DESCRIPTION

Figure 1:
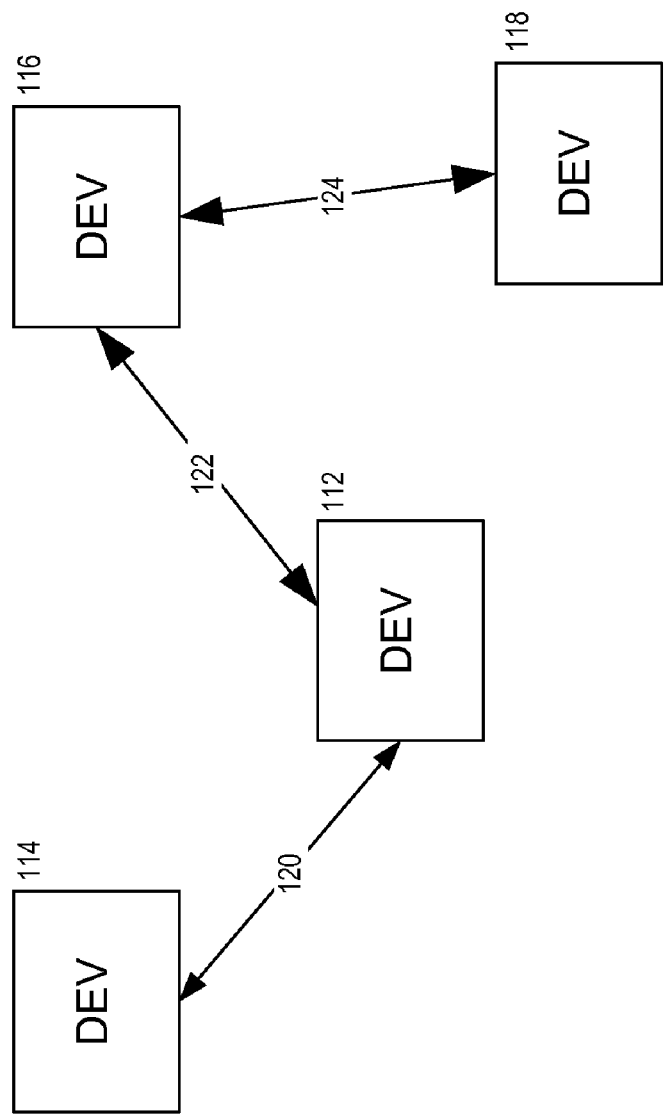
FIG. 1 is a block diagram of an exemplary ad hoc wireless network.

Various embodiments are now described with reference to the drawings. In the following description, for purposes of explanation, numerous specific details are set forth in order to provide a thorough understanding of one or more aspects. It may be evident, however, that such embodiment(s) may be practiced without these specific details. In other instances, well-known structures and devices are shown in block diagram form in order to facilitate describing these embodiments.

As used in this application, the terms "component," "module," "system," and the like are intended to refer to a computer-related entity, either hardware, firmware, a combination of hardware and software, software, or software in execution. For example, a component may be, but is not limited to being, a process running on a processor, a processor, an object, an executable, a thread of execution, a program, and/or a computer. By way of illustration, both an application running on a computing device and the computing device can be a component. One or more components can reside within a process and/or thread of execution and a component may be localized on one computer and/or distributed between two or more computers. In addition, these components can execute from various computer readable media having various data structures stored thereon. The components may communicate by way of local and/or remote processes such as in accordance with a signal having one or more data packets (e.g., data from one component interacting with another component in a local system, distributed system, and/or across a network such as the Internet with other systems by way of the signal). The word "exemplary" is used herein to mean "serving as an example, instance, or illustration." Any embodiment described herein as "exemplary" is not necessarily to be construed as preferred or advantageous over other embodiments.

Furthermore, various embodiments are described herein in connection with a user device. A user device can also be called a system, a subscriber unit, subscriber station, mobile station, mobile device, remote station, access point, remote terminal, access terminal, terminal device, handset, host, user terminal, terminal, user agent, wireless terminal, wireless device, or user equipment. A user device can be a cellular telephone, a cordless telephone, a Session Initiation Protocol (SIP) phone, a wireless local loop (WLL) station, a Personal Digital Assistant (PDA), a handheld device having wireless connection capability, or other processing device(s) connected to a wireless modem. In certain embodiments, the user device may be a consumer electronics device with a UWB modem attached, such as printer, camera/camcorder, music player, standalone magnetic or flash storage device, or other AV equipment with content storage, for example.

Moreover, various aspects or features described herein may be implemented as a method, apparatus, or article of manufacture using standard programming and/or engineering techniques. The term "article of manufacture" as used herein is intended to encompass a computer program accessible from any computer-readable device, carrier, or media. For example, computer readable media can include but are not limited to magnetic storage devices (e.g., hard disk, floppy disk, magnetic strips . . . ), optical disks (e.g., compact disk (CD), digital versatile disk (DVD) . . . ), smart cards, and flash memory devices (e.g., card, stick, key drive . . . ).

Various embodiments will be presented in terms of systems that may include a number of devices, components, modules, and the like. It is to be understood and appreciated that the various systems may include additional devices, components, modules, and the like, and/or may not include all of the devices, components, modules and so forth, discussed in connection with the figures. A combination of these approaches may also be used.

With reference now to the drawings, FIG. 1 illustrates example ad hoc wireless network 100. Wireless network 100 can include any number of mobile devices or nodes, of which four are illustrated for ease of illustration, that are in wireless communication. Mobile devices can be, for example, cellular phones, smart phones, laptops, handheld communication devices, handheld computing devices, satellite radios, global positioning systems, Personal Digital Assistants (PDAs), and/or other suitable devices for communicating over wireless network 100. Wireless network 100 can also include one or more base stations or access points (not shown).

Figure 2:
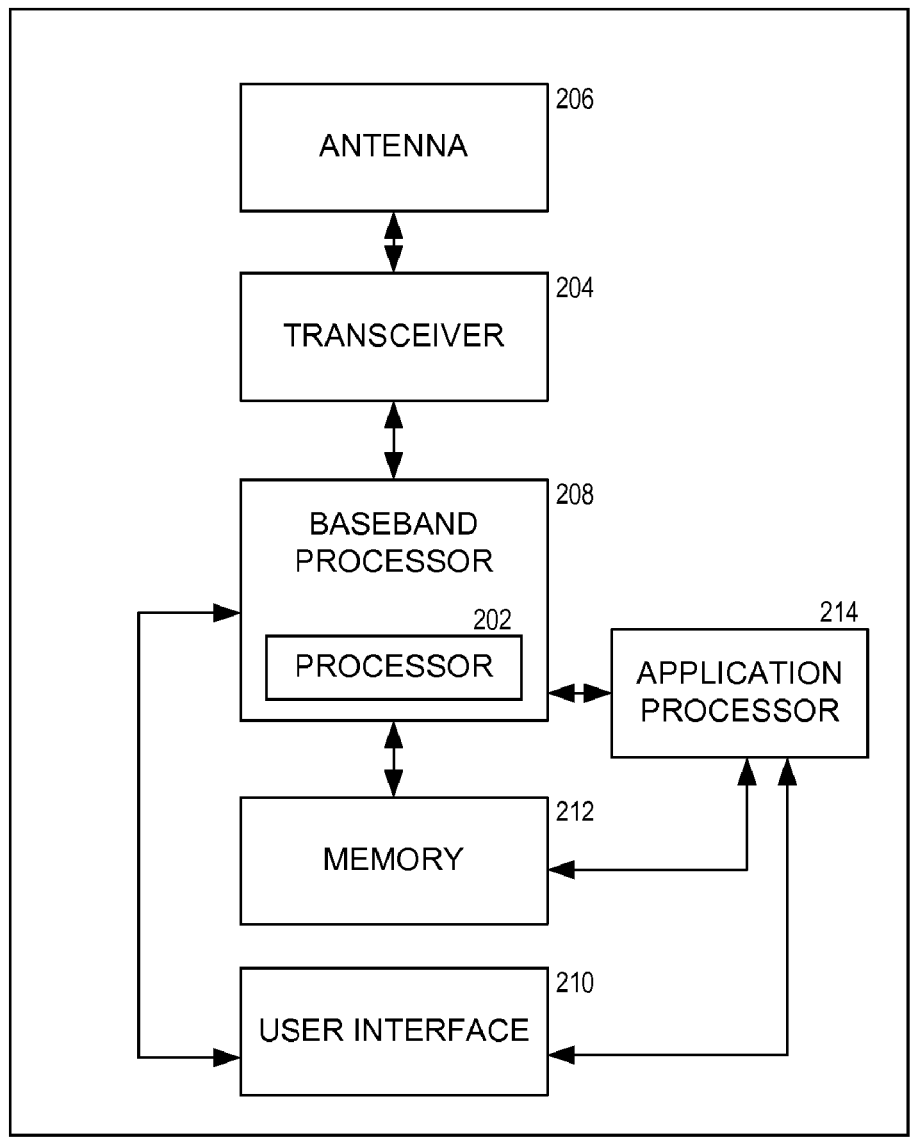
FIG. 2 is a block diagram of an exemplary wireless terminal device.

In wireless network 100, terminal device 112 is shown communicating with terminal device 114 via communication link 120 and with terminal device 116 via communication link 112. Terminal device 116 is also shown communicating with terminal device 118 via communication link 124. Terminal devices 112, 114, 116 and 118 may be structured and configured in accordance with the exemplary simplified block diagram of a possible configuration of a terminal device 200 as shown in FIG. 2. As those skilled in the art will appreciate, the precise configuration of terminal device 200 may vary depending on the specific application and the overall design constraints. Processor 202 can implement the systems and methods disclosed herein.

Terminal device 200 can be implemented with a front-end transceiver 204 coupled to an antenna 206. A baseband processor 208 can be coupled to the transceiver 204. The baseband processor 208 can be implemented with a software based architecture, or other type of architectures, such as hardware or a combination of hardware and software. A microprocessor can be utilized as a platform to run software programs that, among other functions, provide control and overall system management function. A digital signal processor (DSP) can be implemented with an embedded communications software layer, which runs application specific algorithms to reduce the processing demands on the microprocessor. The DSP can be utilized to provide various signal processing functions such as pilot signal acquisition, time synchronization, frequency tracking, spread-spectrum processing, modulation and demodulation functions, and forward error correction.

Terminal device 200 can also include various user interfaces 210 coupled to the baseband processor 208. User interfaces 210 can include a keypad, mouse, touch screen, display, ringer, vibrator, audio speaker, microphone, camera, storage and/or other input/output devices.

The baseband processor 208 comprises a processor 202. In a software-based implementation of the baseband processor 208, the processor 202 may be a software program running on a microprocessor. However, as those skilled in the art will readily appreciate, the processor 202 is not limited to this embodiment, and may be implemented by any means known in the art, including any hardware configuration, software configuration, or combination thereof, which is capable of performing the various functions described herein. The processor 202 can be coupled to memory 212 for the storage of data. An application processor 214 for executing application operating system and/or separate applications may also be provided as shown in FIG. 2. Application processor 214 is shown coupled to baseband processor 208, memory 212, and user interface 210.

Figure 3:
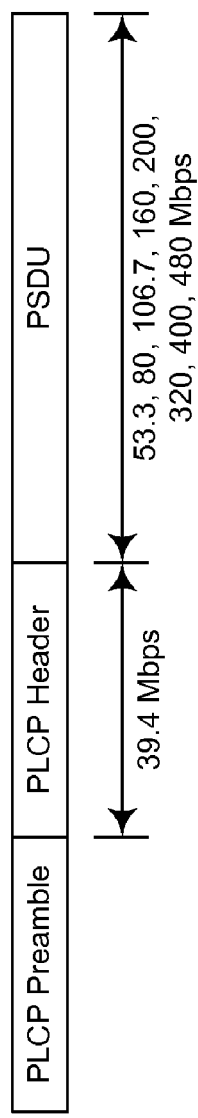
FIG. 3 is a packet structure conforming to the WiMedia Ultra-Wideband (UWB) standard.

FIG. 3 illustrates a packet structure 300 of a packet conforming with the WiMedia Ultra-Wideband (UWB) physical layer (PHY) and media access layer (MAC) standard for high rate, short range wireless communication as promulgated by ECMA International in Standard ECMA-368, "High Rate Ultra Wideband PHY and MAC Standard" (December 2005).

Figure 4:
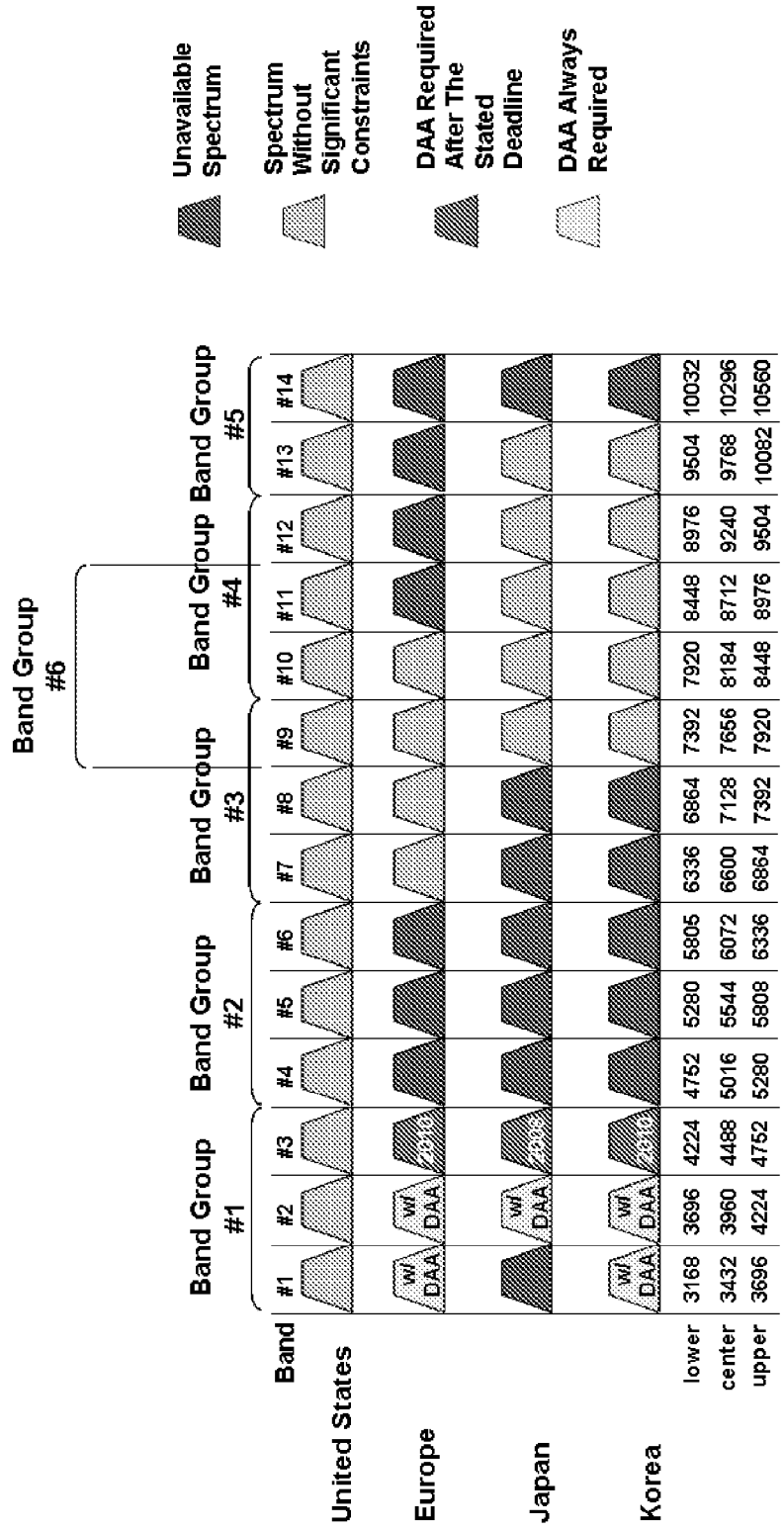
FIG. 4 is a chart of the worldwide allocation of the UWB spectrum.

The ECMA Standard specifies a UWB PHY for a wireless personal area network (PAN) utilizing the unlicensed 3,100-10,600 MHz frequency band, supporting data rates of 53.3 Mb/s, 80 Mb/s, 106.7 Mb/s, 160 Mb/s, 200 Mb/s, 320 Mb/s, 400 Mb/s, and 480 Mb/s. The UWB spectrum is divided into 14 bands, each with a bandwidth of 528 MHz. The first 12 bands are then grouped into 4 band groups consisting of 3 bands, and the last two bands are grouped into a fifth band group. FIG. 4 illustrates a worldwide allocation of the UWB spectrum.

This ECMA Standard specifies a multiband orthogonal frequency division modulation (MB-OFDM) scheme to transmit information. A total of 110 sub-carriers (100 data carriers and 10 guard carriers) are used per band to transmit the information. In addition, 12 pilot subcarriers allow for coherent detection. Frequency-domain spreading, time-domain spreading, and forward error correction (FEC) coding are used to vary the data rates. The FEC used is a convolutional code with coding rates of ⅓, ½, ⅝ and ¾.

The coded data is then spread using a time-frequency code (TFC). In one approach, as promulgated by the ECMA standard, there are two types of time-frequency codes (TFCs): one where the coded information is interleaved over three bands, referred to as Time-Frequency Interleaving (TFI); and, one where the coded information is transmitted on a single band, referred to as Fixed Frequency Interleaving (FFI).

Within each of the first four band groups, four time-frequency codes using TFI and three time-frequency codes using FFI are defined; thereby, providing support for up to seven channels per band. For the fifth band group, two time-frequency codes using FFI are defined. This ECMA Standard specifies 30 channels in total.

Figure 5:
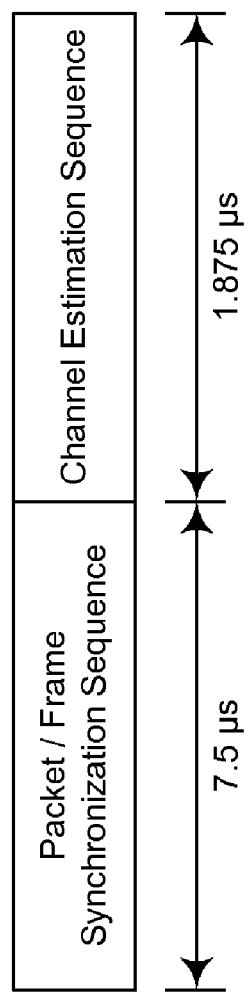
FIG. 5 is a preamble structure of the packet of FIG. 3.

FIG. 5 illustrates the standard preamble structure of the WiMedia UWB packet of FIG. 3. The preamble contains a total of 30 OFDM symbols. The first 24 preamble symbols are used for packet detection, timing estimation, CFO estimation and frame synchronization. Channel estimation uses the last 6 preamble symbols.

Figure 6:
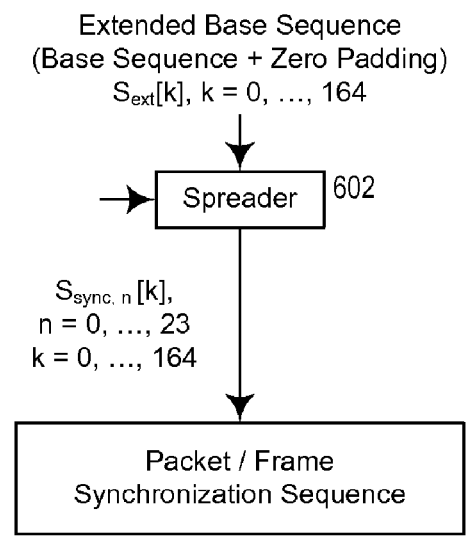
FIG. 6 is a block diagram of a packet/frame synchronization sequence generator for the preamble structure of FIG. 5.

FIG. 6 is a block diagram of a preamble symbol generator 600, including a spreader 602, illustrating one approach of how preamble symbols may be generated, where:

1. For a given a time-frequency code (TFC) (i.e., 1-10, referred to as TFC-1 to TFC-10), select the time-domain base sequence $s_{base}[m]$, m=0, 1, . . . , 127 and the binary cover sequence $s_{cover}[n]=\pm 1$, n=0, 1, . . . , 23. The binary cover sequence is used as a delimiter for determining the ending of the packet/frame synchronization sequence.

2. Pad 37 zeros at the end of the base sequence to form the extended sequence $s_{ext}[k]$, k=0, 1, . . . , 164.

3. Spread the cover sequence with the extended based sequence using the spreader 602. The kth sample of the nth preamble symbol is given by:

$$s_{sync,n}[k]=s_{cover}[n]\times s_{ext}[k], k=0, 1, \ldots, 164, n=0, 1, \ldots, 23.$$

Figure 7:
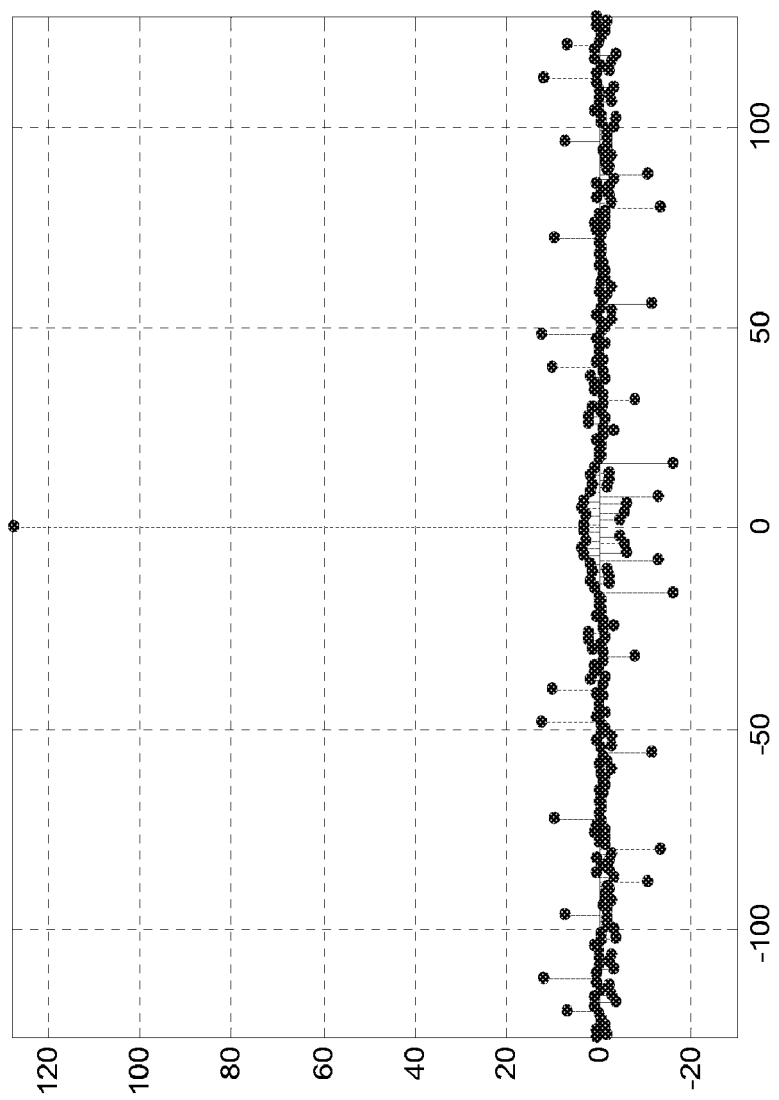
FIG. 7 is a plot of an aperiodic auto-correlation function of a base sequence used to generate a preamble pattern.
Figure 8:
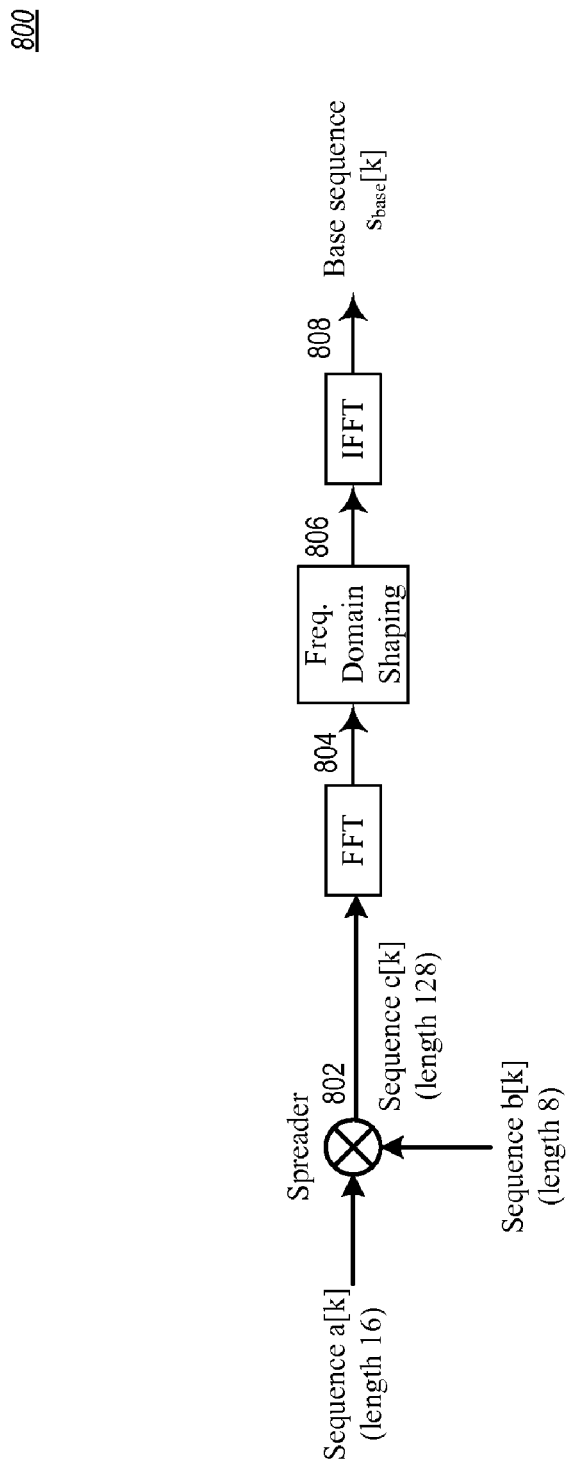
FIG. 8 is a block diagram of a hierarchical base sequence generator used to generate a base sequence.

FIG. 7 illustrates the aperiodic auto-correlation of the base sequence $s_{base}[m]$ corresponding to TFC-1. Other base sequences may have similar auto-correlation functions. In one synchronization approach, the excellent auto-correlation property is exploited. For example, the base sequence is generated from a hierarchical base sequence generator 800 as shown in FIG. 8. The basic premise behind using a hierarchical sequences is to partition the encoding process at the transmitter into a hierarchy so that the complexity of the decoding process at the receiver is reduced. Referring to the figure, a first binary sequence {a[k], k=0, 2, . . . 15} is spread by a second binary sequence {b[k], k=0, 2, . . . 7} with a spreader 802 to generate an intermediate sequence (also referred to as a binary hierarchical sequence) C {c[k], k=0, 2, . . . 127} of length 128. Then, after taking a fast Fourier transform (FFT) of the intermediate sequence C using an FFT module 804 and shaping the sequence in the frequency domain using a frequency domain shaping module 806, the sequence is transformed back to the time domain via an inverse FFT (IFFT) module 808 to obtain the base sequence $s_{base}$[m]. There is a unique set of binary sequences {a[k]} and {b[k]} corresponding to each of the ten base sequences.

Figure 9:
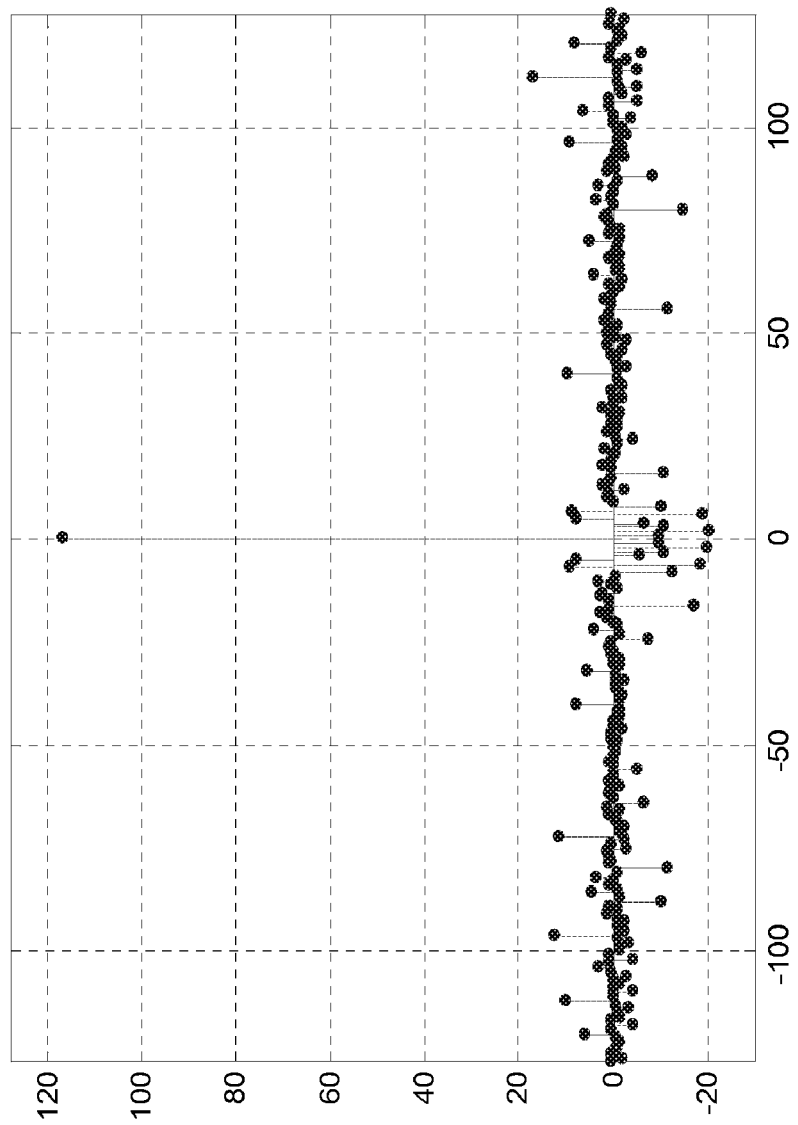
FIG. 9 is a plot of the aperiodic cross-correlation between the base sequence of FIG. 7 and the corresponding hierarchical base sequence of FIG. 8.
Figure 10:
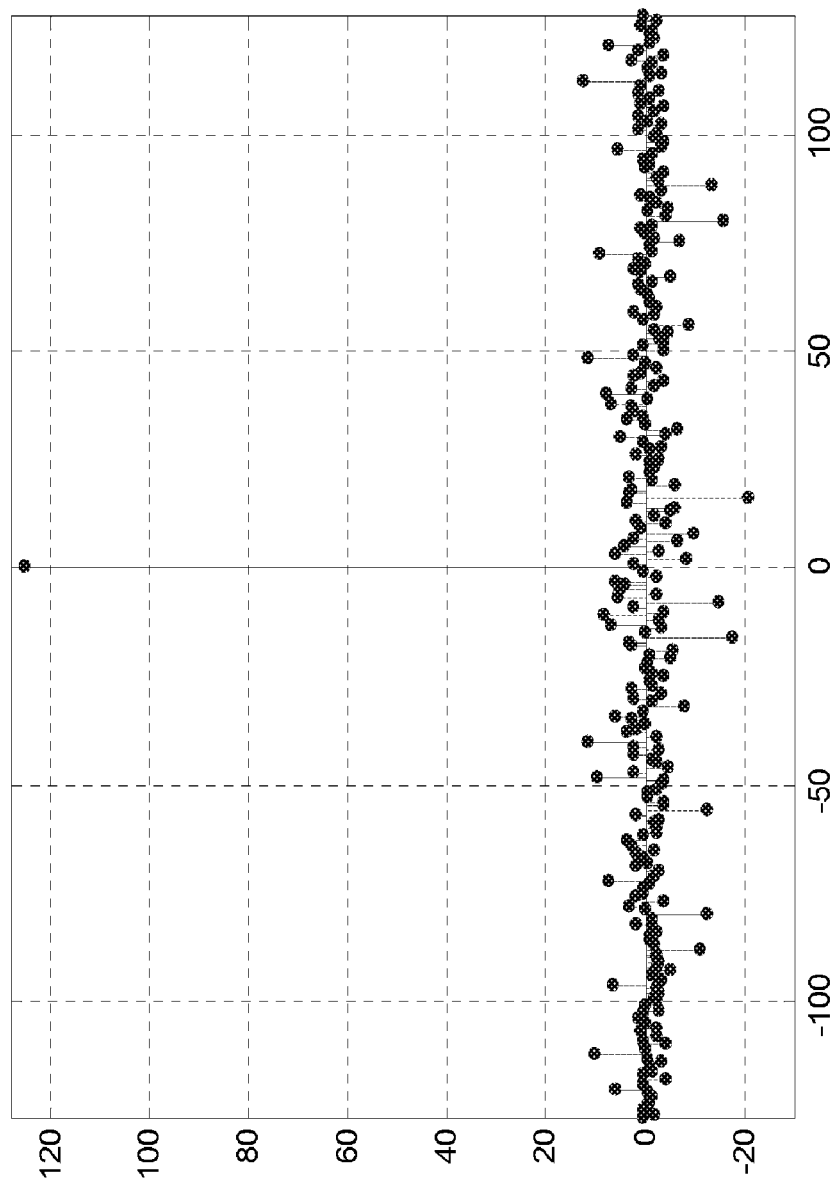
FIG. 10 is a plot of the aperiodic cross-correlation between the base sequence of FIG. 7 and a rounded version of the corresponding base sequence.

FIG. 9 illustrates the aperiodic cross-correlation between the base sequence $s_{base}$[m] for TFC-1 and the corresponding intermediate sequence C {c[k]} generated using the hierarchical base sequence generator 800. This cross-correlation property indicates that when a matched filter is employed at the receiver, the base sequence can be replaced by the binary sequence C as the filter coefficients. In one approach, as illustrated below, the hierarchical structure of the binary sequence C can be efficiently used to simplify the hardware of the receiver used for synchronization. Further, it may be advantageous to use the rounded version of the preamble base sequence as the matched filter coefficients as well. FIG. 10 illustrates the aperiodic cross-correlation between the base sequence $s_{base}$[m] for TFC-1 and the rounded version of the corresponding base sequence.

Figure 11:
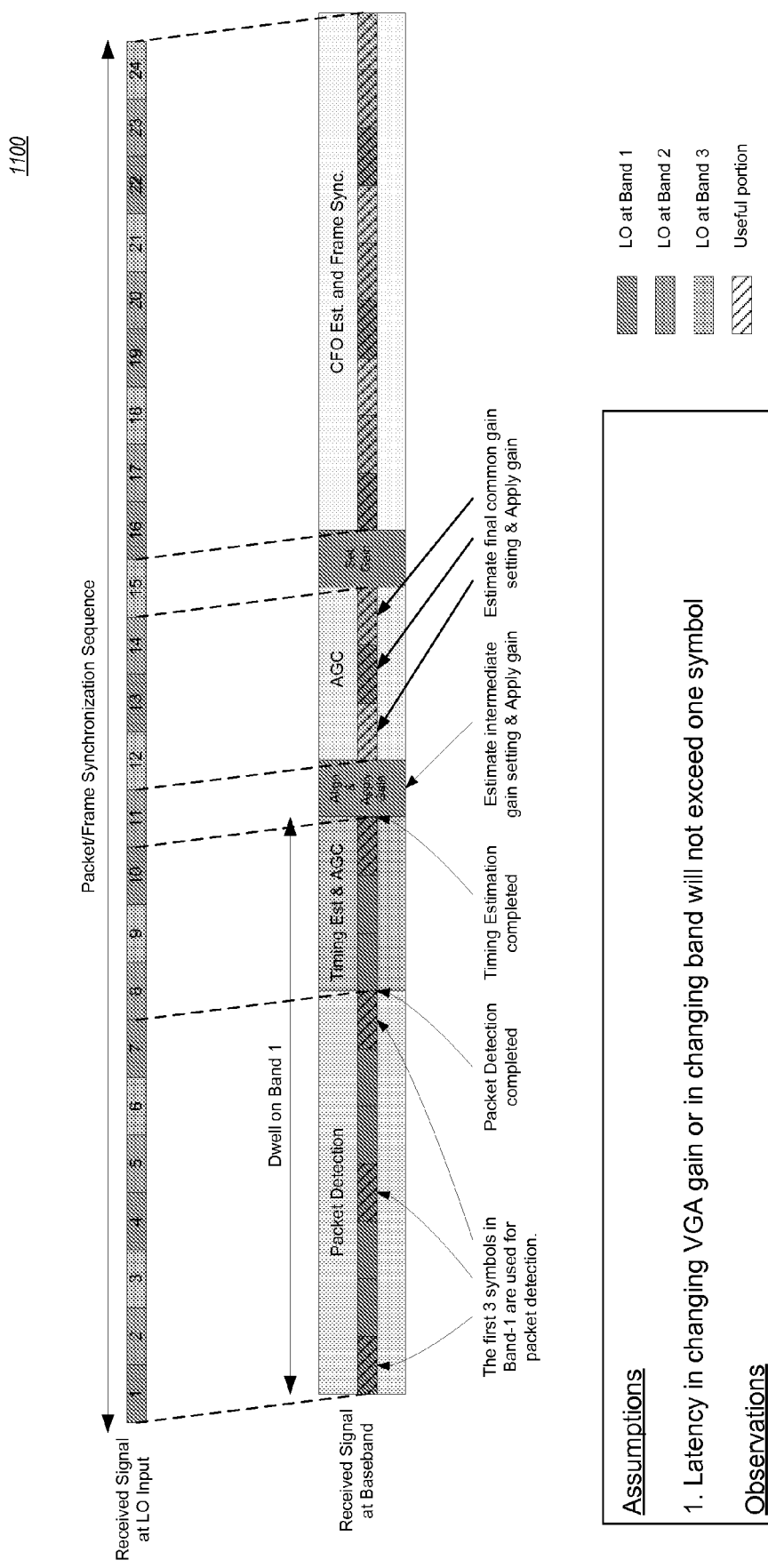
FIG. 11 is a timeline illustrating the acquisition/synchronization process for time-frequency code (TFC)-1 and TFC-2.
Figure 12:
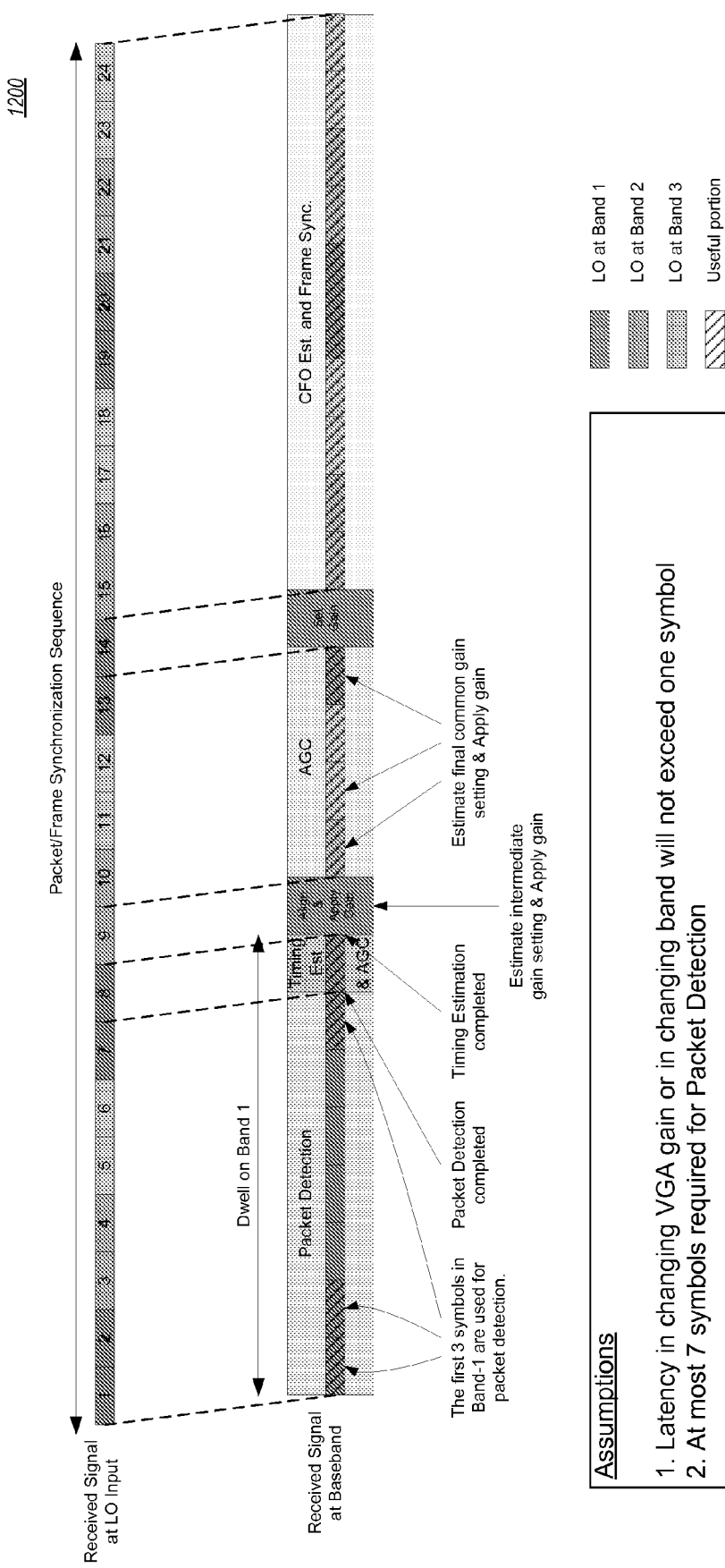
FIG. 12 is a timeline illustrating the acquisition/synchronization process for TFC-3 and TFC-4.
Figure 13:
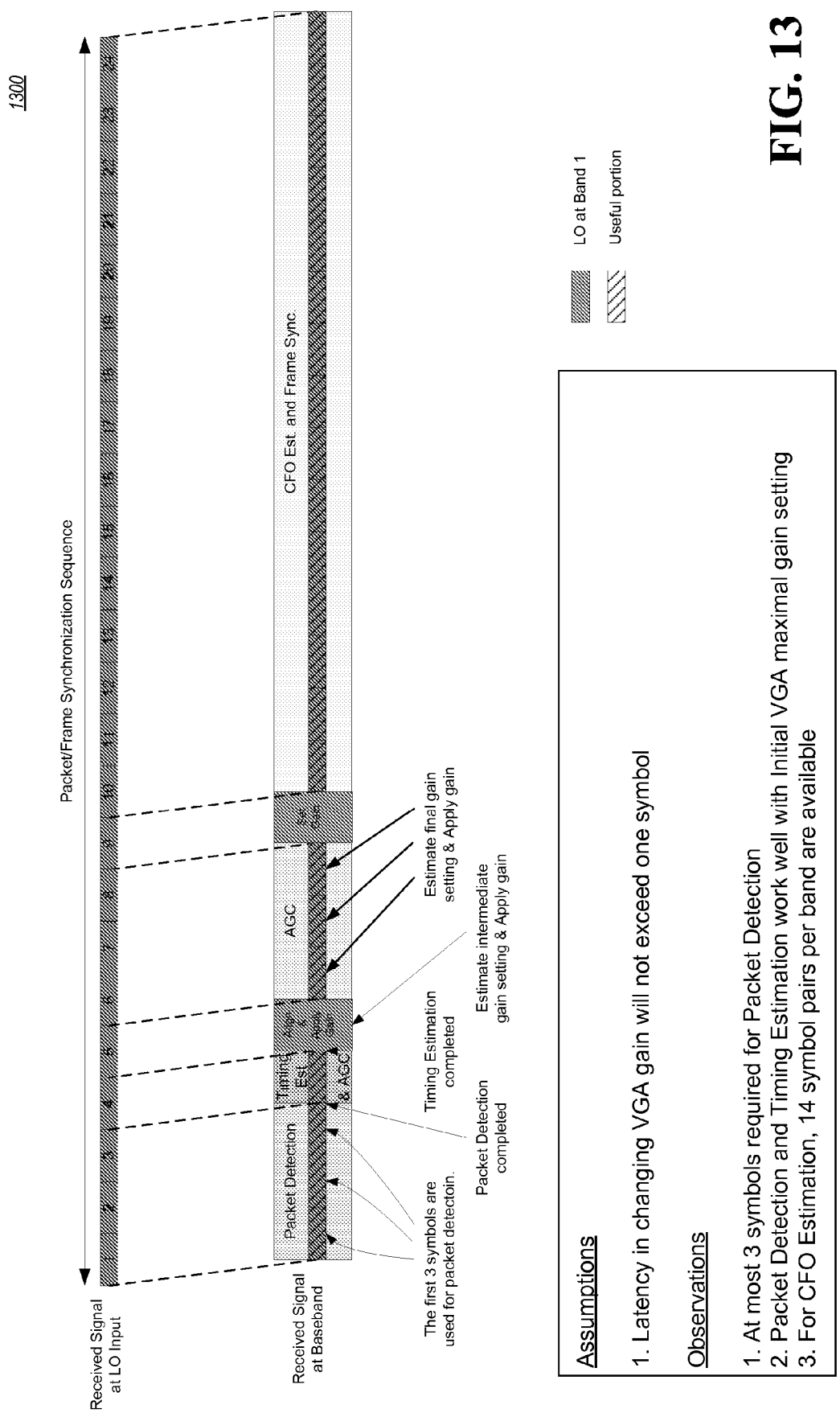
FIG. 13 is a timeline illustrating the acquisition/synchronization process for TFC-5, TFC-6 and TFC-7.
Figure 14:
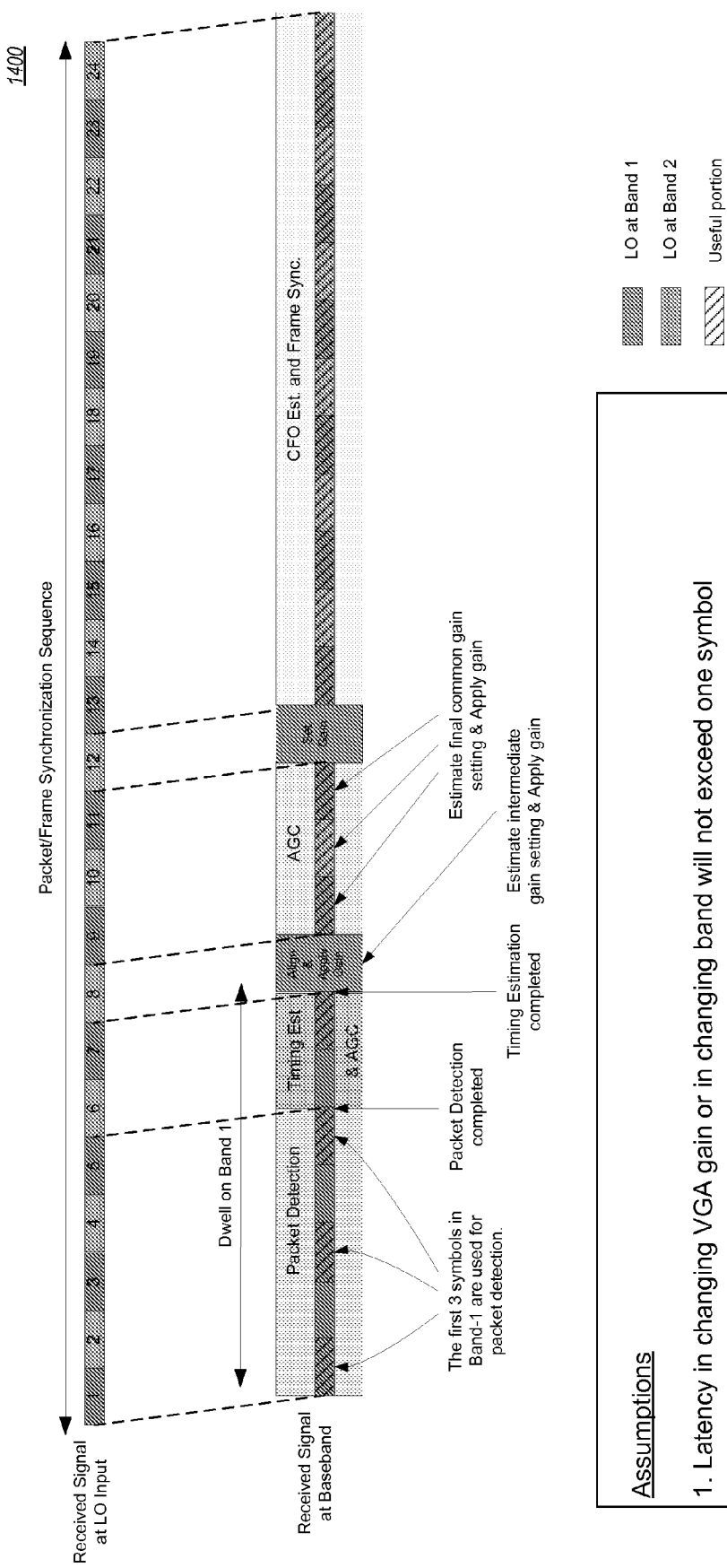
FIG. 14 is a timeline illustrating the acquisition/synchronization process for TFC-8, TFC-9 and TFC-10.

As a synchronization overview, FIG. 11-FIG. 14 illustrate the synchronization and acquisition timelines for all the TFCs. Specifically, FIG. 11 illustrates an acquisition timeline 1100 for TFC-1 and TFC-2; FIG. 12 illustrates an acquisition timeline 1200 for TFC-3 and TFC-4; FIG. 13 illustrates an acquisition timeline 1300 for TFC-5, TFC-6 and TFC-7; and FIG. 14 illustrates an acquisition timeline 1400 for TFC-8, TFC-9 and TFC-10.

Referring initially to FIG. 11, the major synchronization tasks can be separated into three separate parts:
1. Packet detection.
2. Timing estimation.
3. Carrier frequency offset (CFO) estimation and frame synchronization.

As discussed above, the ECMA standard provides for multiple bands and, as seen from the timelines for all TFCs, a receiver will by default dwell on Band-1 before packet detection is asserted. This is because before packet detection, the receiver has no knowledge about the correct timing to switch to other bands (if it is in the TFI mode). Thus, the first three preamble symbols in Band-1 will be consumed for packet detection. Once packet detection has been completed, the next phase, timing estimation, is enabled and the receiver will scan for the next preamble symbol in Band-1 to determine the optimal FFT window for the OFDM symbol. After timing estimation has been completed (e.g., the timing is recovered) for Band-1, the receiver will have enough information to know to switch to other bands according to the TFC, and automatic gain control (AGC) gain estimation will be performed. After AGC is settled, the rest part of the preamble symbols will be used for CFO estimation and frame sync detection. Whenever frame sync is detected, the final output of the CFO estimation will be sent to the phase rotator and the receiver will proceed with channel estimation.

Figure 15:
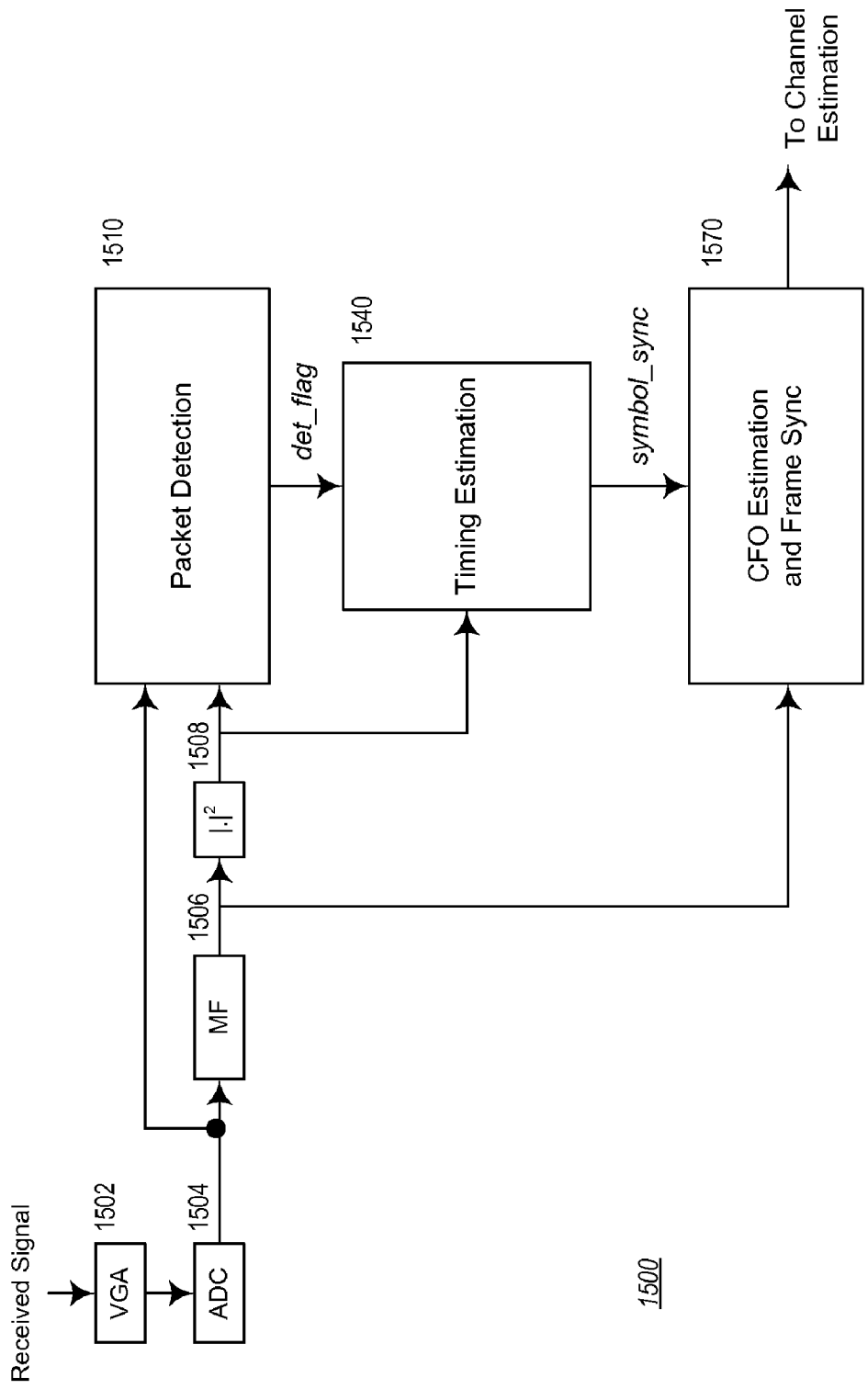
FIG. 15 is a block diagram of a synchronizer, which includes a packet detection module, a timing estimation module, and a carrier frequency offset (CFO) estimation and frame synchronization module.

FIG. 15 illustrates a synchronizer 1500 for performing the major synchronization tasks. The synchronizer 1500 includes a variable gain amplifier (VGA) module 1502, an analog-to-digital converter (ADC) 1504, a matched filter (MF) 1506, a squaring unit 1508, a packet detection module 1510, a timing estimation module 1540 and a CFO estimation and frame synchronization module 1570.

Figure 24:
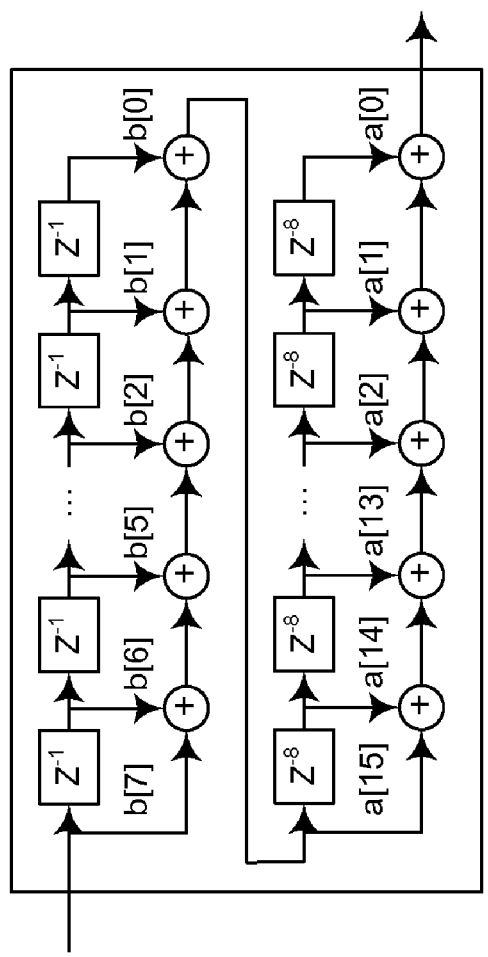
FIG. 24 is a first exemplary implementation of the matched filter of the synchronizer of FIG. 15.
Figure 25:
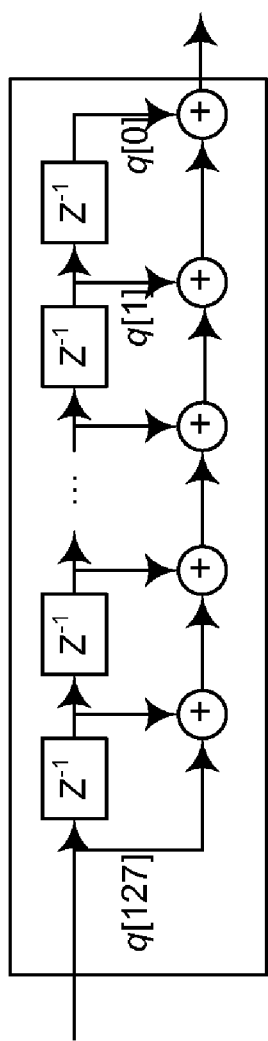
FIG. 25 is a second exemplary implementation of the matched filter of the synchronizer of FIG. 15; and, FIG. 26 is an exemplary implementation of a L-tap multipath energy combiner used to implement a sliding window.

The coefficients {q[k], k=0, 2, . . . , 127} of the MF 1506 can be chosen either as the binary sequence {c[k], k=0, 2, . . . , 127} or the rounded preamble base sequence {round ($s_{base}$[k]), k=0, 2, . . . , 127}, as discussed above. Due to the hierarchical structure of the binary sequence {c[k]}, however, the implementation of the MF 1506 may be simplified as shown in a binary hierarchical sequence MF 2400 of FIG. 24; while for the rounded version, a finite impulse response (FIR) implementation MF 2500 is shown in FIG. 25, which in one approach is an FIR filter with 127 tapped delay lines.

In the rounded approach, the matched filter coefficients q[k], k=0, 2, . . . 127 is set to the rounded version of the preamble base sequence Round($s_{base}$[k]). As observed for all the preamble base sequences, Round($s_{base}$[k]) only takes values from {±2, ±1, 0}, which helps to reduce the hardware complexity as multiplication by 2 can be conveniently implemented as left shifting 1 bit. Also, as seen in FIG. 10, Round ($s_{base}$[k]) maintains good cross-correlation property with the base sequence $s_{base}$[k]. The complexity of the two different methods for the matched filter implementation is summarized in the following table:

TABLE 1

Matched filter implementation comparison.

| Matched Filter Type | Number of Real Multi- plications | Number of Real Additions | LUT Size (bits) |
|---|---|---|---|
| Binary Hierarchical | 0 | 22 | 10*(16 + 8) = 240 |
| Rounded Base Sequence | 0 | 127 | 10*128*3 = 3840 |

The number of operations is for either I or Q branch within one sample duration $T_{sample}$=1/528 MHz=1.89 ns. For each approach, the reference sequences can be stored in a lookup table (LUT) of the size as listed in Table 1.

The output of the MF 1506 is processed by the squaring unit 1508. Denoting the received samples as r[n], the magnitude square of the matched filter output may be expressed as:

$$R[n] = \left| \sum_{k=0}^{127} r[n+k] \cdot q[k] \right|^2 ,$$

Figure 26:
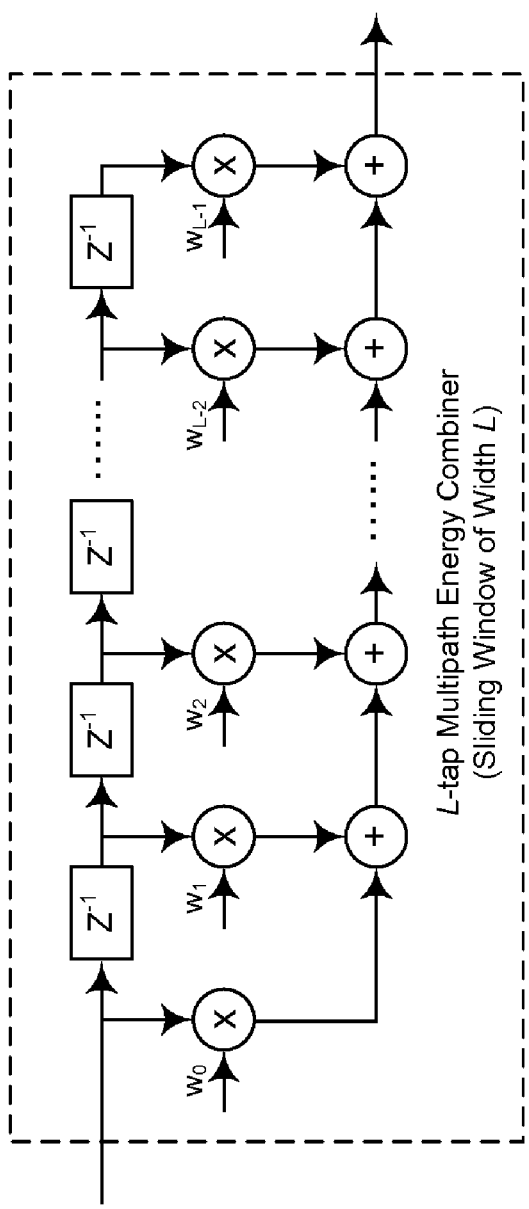

It is noted that an equal gain combining (EGC) operation may be performed to collect the energy from the multipath channels:

$$D[n] = \sum_{m'=n}^{n+N-1} R[m'],$$

where N is the number of consecutive paths that are combined and D[n] is the sliding window output. The EGC may be implemented as an L-tap multipath energy combiner 2600 as shown in FIG. 26. The L-tap multipath energy combiner 2600 allows a different weight to be assigned to each tap. The results of the EGC operation may be used by the packet detection module 1510 and the timing estimation module 1540.

As discussed, the first step in the synchronization process is for the packet detection module 1510 to detect the presence of a valid packet. The packet detection module 1510 will assert a packet detection signal to the timing estimation module 1540 after a valid packet has been detected. Specifically, once packet detection is asserted (i.e., the packet detection module 1510 has indicated that a packet has been detected by setting the det_flag to a logical true), the timing estimation module 1540 is enabled. Then, the timing estimation module 1540 acquires the timing, and asserts a symbol_sync signal to the CFO estimation and frame synchronization module 1570.

Figure 16:
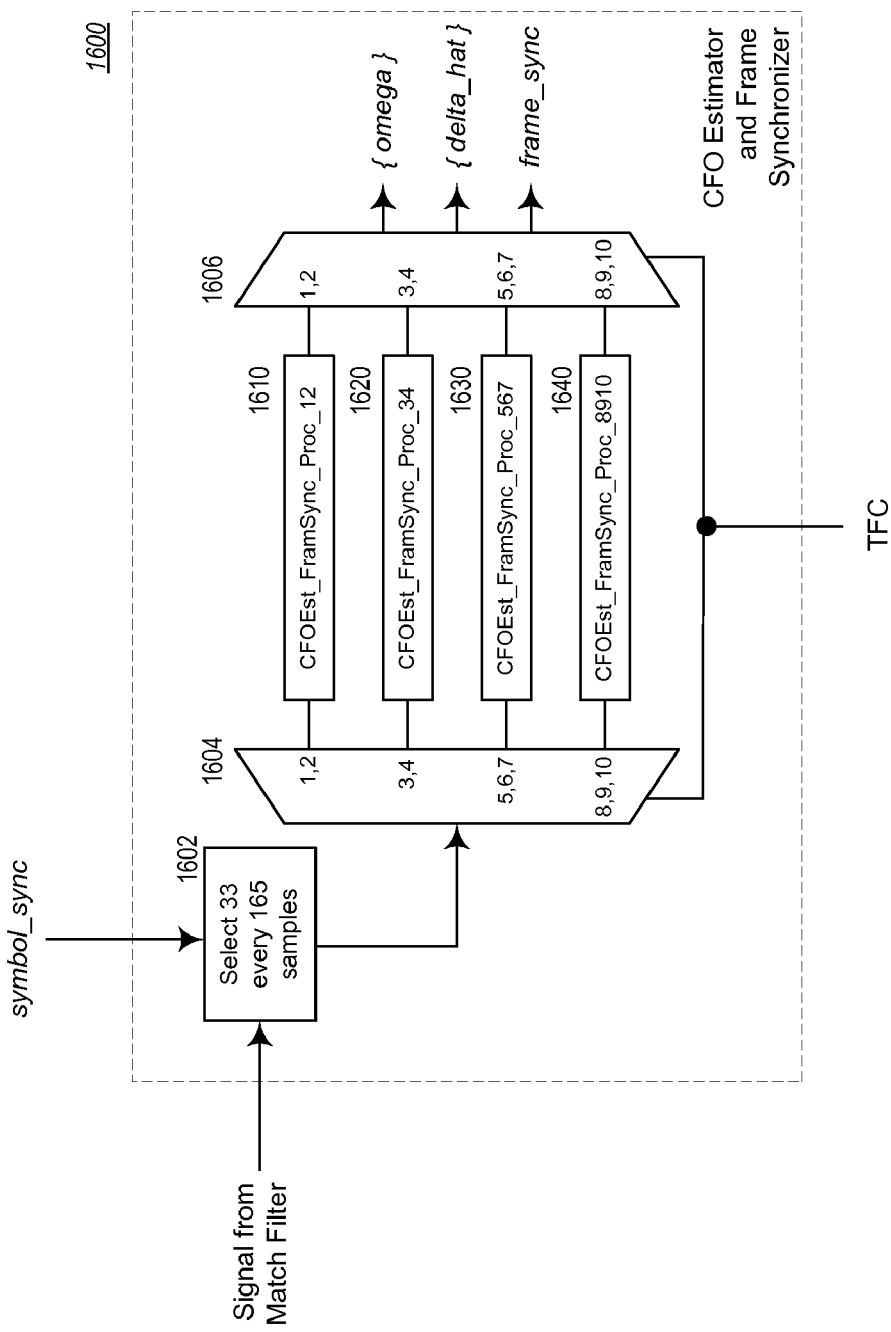
FIG. 16 is a block diagram of a CFO estimator and frame synchronizer implementing the CFO estimation and frame synchronization module of the synchronizer of FIG. 15.

FIG. 16 illustrates an exemplary CFO estimator and frame synchronizer 1600 that may be implemented for the CFO estimation and frame synchronization module 1570. The CFO estimator and frame synchronizer 1600 includes a sampler 1602, a demultiplexer 1604 and a multiplexer 1606, and a plurality of CFO estimator and frame synchronizer submodules 1610, 1620, 1630, 1640. The demultiplexer 1604 and the multiplexer 1606 route selective signals from the MF 1506 to each one of the plurality of CFO estimation and frame synchronization processors 1610, 1620, 1630, 1640 based on the TFC. In one approach, the output of the MF 1506, instead of the received signal directly, is used to perform CFO estimation and take the advantage of a processing gain of $10 \cdot \log_{10} 128 = 21$ dB.

Figure 17:
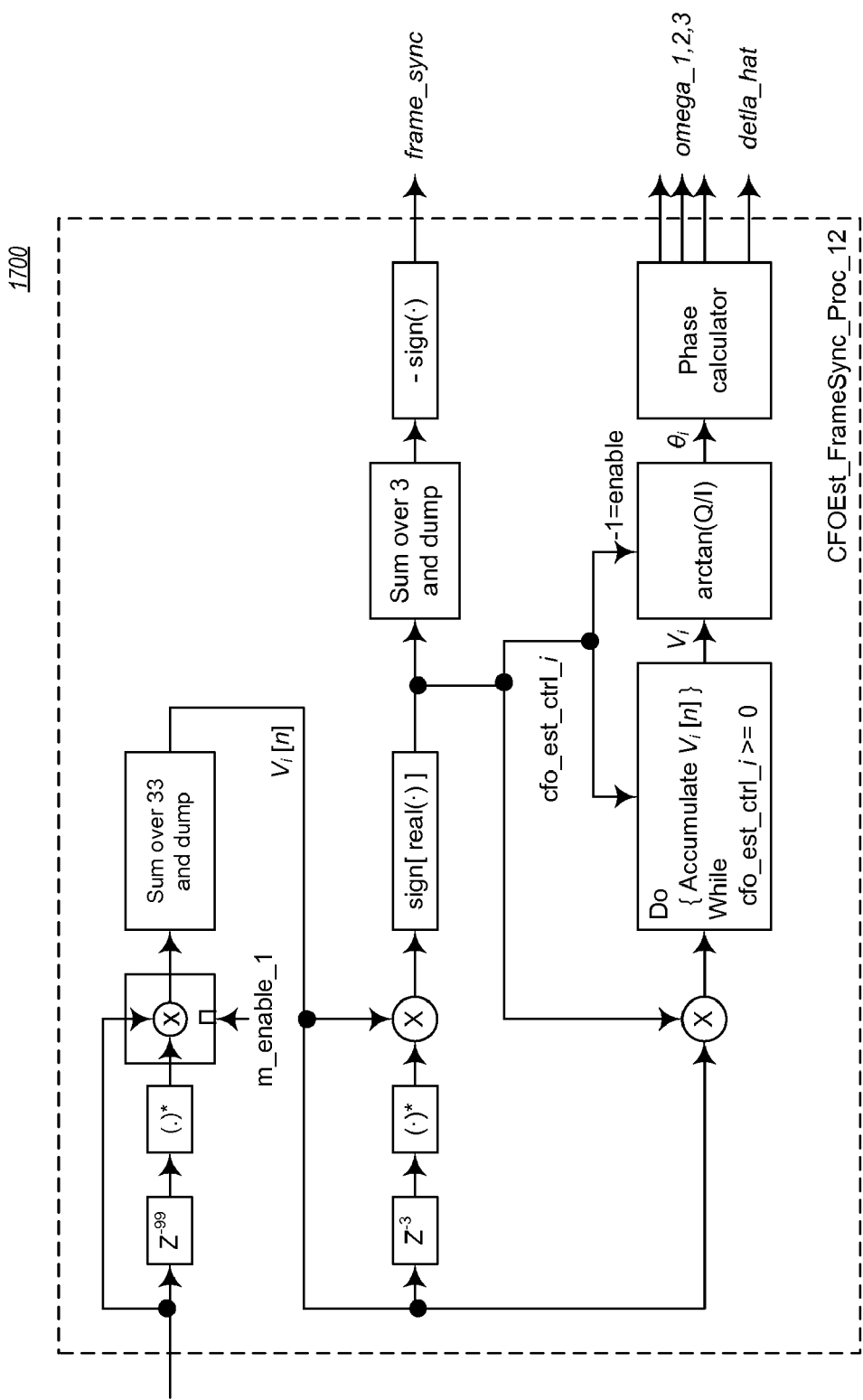
FIG. 17 is a block diagram of a CFO estimation and frame synchronization processor for TFC-1 and TFC-2.

FIG. 17 illustrates the CFO estimation and frame synchronization processor 1610 for TFC-1 and TFC-2. The operation of the processor is identical for TFC-1 and TFC-2. Initially, the frequency is determined, where the initial CFO is denoted as $\Delta F_i = f_{T,i} - f_{R,i}$ where $f_{T,i}$ and $f_{R,i}$ are the transmitter and receiver's local frequency for band-i, i=1, 2, 3. Frequency error introduces negligible loss for coherently accumulating 128 OFDM samples. Thus, for the nth preamble symbol in band-i, the mth output from the MF 1506 is approximately:

$$f_i[n,m] = \sqrt{128 D_0 E_s} \cdot s_{cover}[3n+i-1] \cdot h_i[m] \cdot \exp(j2\pi \Delta F_i t_{3n+i,m}) + w_{MF},$$
$$n=0, 1, \ldots, 7; i=1, 2, 3.$$

where $t_{3n+i,m}$ is the sampling time corresponding to $f_i[n, m]$, and $w_{MF}$ is the noise term, and $h_i[m]$ is the mth channel tap coefficient for band-i.

According to the symbol_sync information obtained from the timing estimation module 1540, for every 165 outputs from the MF 1506, 33 consecutive samples are selected as the input to the frequency discriminator (FD). In one approach, the symbol_sync information identifies the first sample in the 33 consecutive samples. In another approach, the samples do not have to be consecutive and may also comprise of a different number of samples.

The FD calculates the cross-correlation between the output of the MF 1506 of two consecutive preamble symbols in the same band.

$$Q_i[n, m] = f_i[(n+1), m] \overline{f_i[n, m]}$$
$$= 128 D_0 E_s (s_{cover}[3n+i-1] \cdot s_{cover}[3(n+1)+i-1]) \cdot$$
$$|h_i[m]|^2 \exp(j2\pi \cdot \Delta F_i \cdot PT_s) + w_{FD},$$

where $T_s = 1/(528 \text{ MHz})$ is the sampling period, $w_{FD}$ is the noise term from the FD, and $P = 3 \times 165 = 495$ is the delay. By accumulating 33 consecutive FD outputs, the system is able to obtain:

$$V_i[n] = \sum_{m=0}^{32} Q_i[n, m_0 + m]$$
$$= 128 D_0 E_s (s_{cover} \cdot [3n+i-1] s_{cover}[3(n+1)+i-1]) \cdot$$
$$\left( \sum_{k=0}^{32} |h_i[m_0+m]|^2 \right) \exp(j2\pi \cdot \Delta F_i \cdot PT_s) + w_{AC}$$

where $w_{AC}$ is the noise term from the accumulation, and $m_0$ is the starting index obtained by timing estimation. Note that $m_0$ is initially found to maximize the total collected channel energy $$\sum_{k=0}^{32} |h_i[m_0+m]|^2$$

for band-1, but applied to band-2 and band-3 with negligible loss. The following table lists cover sequence for standard preambles:

TABLE 2

Cover Sequence for Standard Preamble

| m | $s_{cover}[m]$ for TFCs 1, 2 | $s_{cover}[m]$ for TFCs 3, 4 | $s_{cover}[m]$ for TFCs 5, 6, 7 | $s_{cover}[m]$ for TFCs 8, 9, 10 |
|---|---|---|---|---|
| 0 | 1 | 1 | −1 | 1 |
| 1 | 1 | 1 | −1 | 1 |
| 2 | 1 | 1 | −1 | −1 |
| 3 | 1 | 1 | −1 | −1 |
| 4 | 1 | 1 | −1 | 1 |
| 5 | 1 | 1 | −1 | 1 |
| 6 | 1 | 1 | −1 | −1 |
| 7 | 1 | 1 | 1 | −1 |
| 8 | 1 | 1 | −1 | 1 |
| 9 | 1 | 1 | −1 | 1 |
| 10 | 1 | 1 | 1 | −1 |
| 11 | 1 | 1 | −1 | −1 |
| 12 | 1 | 1 | −1 | 1 |
| 13 | 1 | 1 | 1 | 1 |
| 14 | 1 | 1 | −1 | −1 |
| 15 | 1 | 1 | −1 | −1 |
| 16 | 1 | 1 | 1 | 1 |
| 17 | 1 | 1 | −1 | 1 |
| 18 | 1 | 1 | −1 | 1 |
| 19 | 1 | −1 | 1 | 1 |
| 20 | 1 | 1 | −1 | 1 |
| 21 | −1 | −1 | 1 | 1 |
| 22 | −1 | 1 | 1 | −1 |
| 23 | −1 | −1 | 1 | −1 |

For frame synchronization detection, as seen in Table 2, the cover sequence for TFC-1 and TFC-2 maintains +1 except for the last symbol in each of the three bands. The sign flipping of the cover sequence in the three bands helps to detect the end of the first 24 preamble symbols and generate the frame_sync signal.

However, also as can be seen from the above equation of $V_i[n]$, the phase rotation due to the CFO is $2\pi \Delta F_i PT_s$, and the phase rotation takes its largest possible value for Band-12 (in Band Group (BG)-4) with a total 40 ppm offset:

$$\theta_{max} = 2\pi \times (9240 \text{ MHz} \times 4 \text{ ppm}) \times (3 \times 165) \times (1/528 \text{ MHz}) = 124.74°$$

This value of $\theta_{max}$ indicates the following:

First, since $|\theta_{max}| < \pi$, it guarantees that for all BGs, there is no "±2nπ" ambiguity for CFO estimation, i.e., the estimated CFO is the total CFO, NOT the fractional.

Second, since $|\theta_{max}|$ may take values greater than $\pi/2$, it is not sufficient to test the two hypotheses:

H0: CFO ($\theta$ only)
H1: CFO and cover sequence sign flipping ($\theta+\pi$)

by examining the variable $V_i[n]$ only, even in a noise-free scenario.

Figure 18:
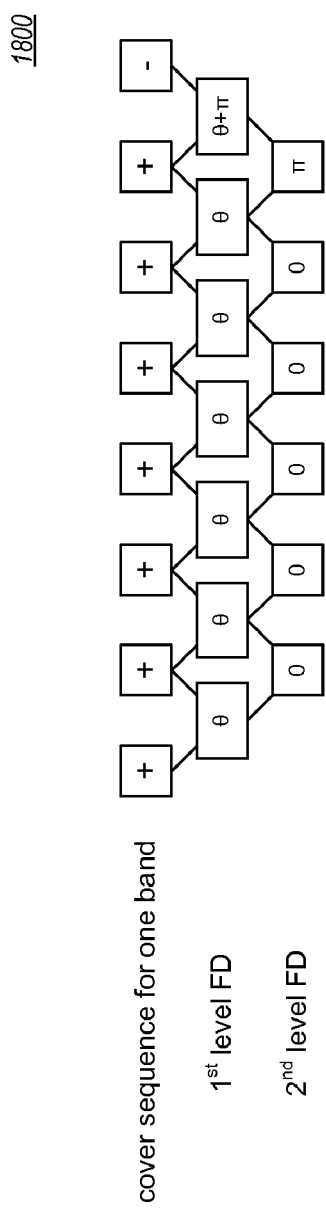
FIG. 18 illustrates the operation of the frame synchronization detection for TFC-1 and TFC-2.

To successfully detect the sign flipping, a second-level frequency discriminator is used:

$$Z_i[n] = V_i[n+1] \cdot (V_i[n])^*, n=0, 1, \ldots, 5,$$

which is illustrated in a frame synchronization detection process 1800 in FIG. 18. The first row represents the cover sequence for any one of the three bands (note that the cover sequences for all the three bands are identical). The second row shows the phase associated with the first-level FD outputs (note the ambiguity between $\theta$ and $\theta+\pi$ for high BGs), and the third row shows the phase associated with the second-level FD outputs.

The end of the cover sequence in each band is detected by the second-level FD:

$$\text{cfo\_est\_ctrl\_}i = \text{sign}[\Re(Z_i[n])] = -1.$$

The frame_sync signal is generated based on a majority vote from the three bands, i.e., whenever there are at least two out of the three bands indicating the end of the cover sequence, frame_sync=+1 is asserted and the receiver is switched to the channel estimation mode. The majority vote can be conveniently implemented as:

$$\text{frame\_sync} = -\text{sign}\left[\sum_{i=1,2,3} \text{cfo\_est\_ctrl\_}i\right]$$

$$= -\text{sign}\left[\sum_{i=1,2,3} \text{sign}[\Re(Z_i[n])]\right].$$

For CFO estimation, for each of the three bands, the first-level FD output $V_i[n]$ is accumulated:

$$V_i = \sum_{n=n_i} V_i[n] \cdot \text{sign}[\Re(Z_i[n-1])], \quad i = 1, 2, 3.$$

where $n_i$ is the starting symbol index for the accumulation in band-i with the initial value $\text{sign}[\Re(Z_i[n_i-1])]=1$. The accumulation continues until the end of the cover sequence in that band is detected (cfo_est_ctrl_i=−1). Then $V_i$ will be processed by an arctan(·) operation to calculate the angle:

$$\hat{\theta}_i = \arctan[\Im(V_i)/\Re(V_i)] \in [-\pi,\pi), i=1, 2, 3,$$

and the estimate of the frequency offset can be calculated as:

$$\hat{\delta} = \frac{1}{3} \cdot \frac{1}{2\pi P T_s F_0}\left[\frac{\hat{\theta}_1}{\alpha_1} + \frac{\hat{\theta}_2}{\alpha_2} + \frac{\hat{\theta}_3}{\alpha_3}\right],$$

where $F_0$=4224 MHz is the base oscillator frequency, and the coefficients $\alpha_i$ are defined as the ratio between the center frequency $F_i$ to the base frequency $F_0$ $$\alpha_i = F_i/F_0, i=1, 2, 3.$$

The final estimates of the frequency error for each of the three bands are given by:

$$\Delta \hat{F}_i = \hat{\delta} \alpha_i F_0, i=1, 2, 3$$

and the phase error per sample is:

$$\omega_i = 2\pi \cdot \Delta \hat{F}_i \cdot T_s = \frac{\alpha_i}{3P}\left[\frac{\hat{\theta}_1}{\alpha_1} + \frac{\hat{\theta}_2}{\alpha_2} + \frac{\hat{\theta}_3}{\alpha_3}\right], \quad i = 1, 2, 3.$$

Finally, the phase error is sent to a phase rotator to correct for any frequency errors.

Figure 19:
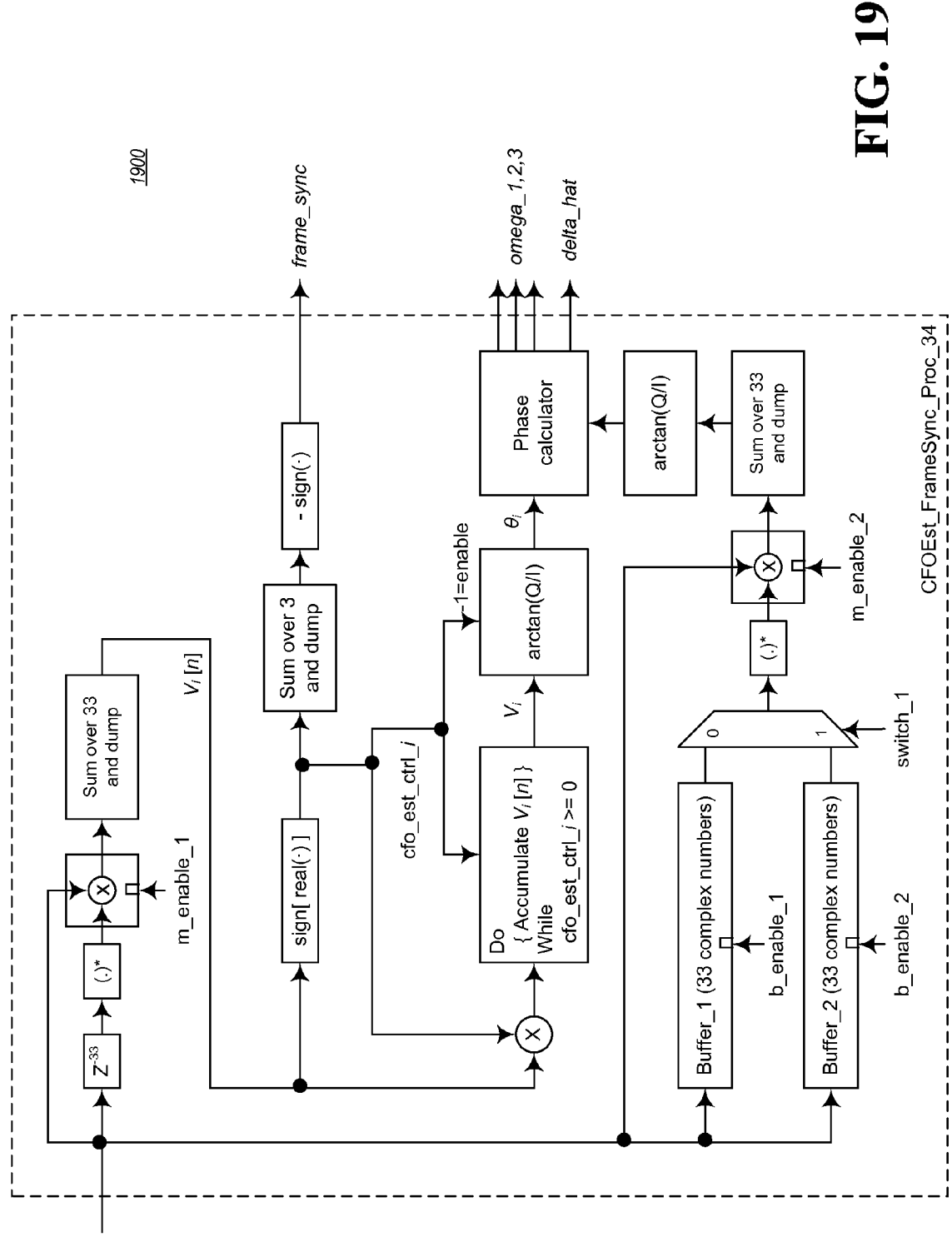
FIG. 19 is a block diagram of a CFO estimation and frame synchronization processor for TFC-3 and TFC-4.

FIG. 19 illustrates an exemplary CFO estimation and frame synchronization processor 1900 that implements the CFO estimation and frame synchronization processor 1620 for TFC-3 and TFC-4. As the operation of the processor is identical for TFC-3 and TFC-4, the description will focus on TFC-3 for simplicity of presentation.

For frequency discrimination of TFC-3 and TFC-4, two first-level frequency discriminators (FDs) are used in one approach to meet the target CFO estimation performance. The first FD calculates the cross-correlation between the outputs of the MF 1506 of two contiguous preamble symbols in the same band:

$$Q_i^{(1)}[n, m] = f_i[(2n+1), m]f_i^*[2n, m]$$

$$= 128 D_0 E_s (s_{cover}[6n + 2(i-1)] \cdot s_{cover}[6n + 2(i-1) + 1]) \cdot$$

$$|h_i[m]|^2 \exp(j2\pi \cdot \Delta F_i \cdot P_1 T_s) + w_{FD},$$

$$n = 0, 1, 2, 3; i = 1, 2, 3$$

where $f_i[2n,m]$ and $f_i[(2n+1),m]$ are the mth output from the MF, for the (2n)th and (2n+1)th preamble symbol in band-i; and $P_1$=165 is the delay. According to the timeline in FIG. 12, the symbol pairs involved in the above equation are listed as follows.

| Band index i | Symbol pairs |
|---|---|
| 1 | 19 and 20 |
| 2 | 15 and 16, 21 and 22 |
| 3 | 17 and 18, 23 and 24 |

By accumulating 33 consecutive outputs from the first FD, it is obtained:

$$V_i^{(1)}[n] = \sum_{m=0}^{32} Q_i^{(1)}[n, m_0 + m] =$$

$$128 D_0 E_s (s_{cover}[6n + 2(i-1)] \cdot s_{cover}[6n + 2(i-1) + 1]) \cdot$$

$$\left(\sum_{k=0}^{32} |h_i[m_0 + m]|^2\right) \exp(j2\pi \cdot \Delta F_i \cdot P_1 T_s) + w_{AC}$$

The second FD calculates the cross-correlation between the outputs of MF 1506 for symbol 15 and 21 (Band-2), and symbol 17 and 23 (Band-3). Note that in order to do this, the outputs for MF 1506 for symbol 15 (Band-2) and symbol 17 (Band-3) are stored in two buffers, each with size of 33 complex numbers. By accumulating 33 consecutive outputs from the second FD, the following is obtained:

$$V_i^{(2)} = 128 D_0 E_s \left( \sum_{k=0}^{32} |h_i[m_0+m]|^2 \right) \exp(j2\pi \cdot \Delta F_i \cdot P_2 T_s) + w_{AC},$$

$$i = 2, 3$$

where the delay becomes $P_2 = 6 \times 165 = 990$.

For frame synchronization detection, referring again to Table 2, the cover sequence for TFC-3 and TFC-4 maintains +1 except for the last symbol in each of the three bands. The phase rotation in $V_i^{(1)}[n]$ due to CFO is $2\pi \Delta F_i P_1 T_s$, and it takes its largest possible value for BAND-12 (in BG-4) with a total 40 ppm offset:

$$\theta_{max} = 2\pi \times (9240 \text{ MHz} \times 40 \text{ ppm}) \times 165 \times (1/528 \text{ MHz}) = 41.58°.$$

The value of $\theta_{max}$ indicates the following

First, since $|\theta_{max}| < \pi$, it guarantees that for all BGs, there is no "$\pm 2n\pi$" ambiguity for CFO estimation, i.e., the estimated CFO is the total CFO, NOT the fractional.

Second, since $|\theta_{max}|$ takes values much less than $\pi/2$, it is possible to test the two hypotheses:

H0: CFO ($\theta$ only)

H1: CFO and cover sequence sign flipping ($\theta + \pi$)

by examining the variable $V_i^{(1)}[n]$ only, even in the low SNR regime.

The end of the cover sequence in each band is detected by the first FD:

$$\text{cfo\_est\_ctrl\_i} = \text{sign}[\Re(V_i^{(1)}[n])] = -1.$$

Similar to TFC-1 and TFC-2, the frame_sync signal is generated based on a majority vote from the three bands:

$$\text{frame\_sync} = -\text{sign}\left[ \sum_{i=1,2,3} \text{cfo\_est\_ctrl\_i} \right] = -\text{sign}\left[ \sum_{i=1,2,3} \text{sign}[\Re(V_i^{(1)}[n])] \right].$$

For CFO estimation, for Band-2 and Band-3, the first FD output is accumulated:

$$V_i^{(1)} = \sum_{n_i} V_i^{(1)}[n] \cdot \text{sign}[\Re(V_i^{(1)}[n])],$$

$$i = 2, 3.$$

where $n_i$ is the starting symbol index for the accumulation in Band-i. The accumulation continues until the end of the cover sequence in that band is detected (cfo_est_ctrl_i=−1). Note that, according to the timeline shown in FIG. 12, there is only one $V_1^{(1)}[n]$ for Band-1, which appears to be very noisy. Thus, in our design, we do not use $V_1^{(1)}[n]$ in the CFO estimation to avoid performance degradation. $V_1^{(1)}[n]$ is only used to detect frame sync.

The final accumulation results $V_2^{(1)}$ and $V_3^{(1)}$ are processed by an arctan(·) function to calculate the angle:

$$\hat{\theta}_i^{(1)} = \arctan[\Im(V_i^{(1)})/\Re(V_i^{(1)})] \in [-\pi, \pi),$$

$$i = 2, 3.$$

The averaged results are:

$$\theta_2^{(1)} = \frac{1}{2}\left[ \hat{\theta}_2^{(1)} + \frac{\alpha_2 \cdot \hat{\theta}_3^{(1)}}{\alpha_3} \right]$$

$$\theta_3^{(1)} = \frac{1}{2}\left[ \frac{\alpha_3 \cdot \hat{\theta}_2^{(1)}}{\alpha_2} + \hat{\theta}_3^{(1)} \right]$$

where the coefficients $\alpha_i$ are defined as the ratio between the center frequency $F_i$ to the base frequency $F_0$:

$$\alpha_i = F_i/F_0, i=2, 3.$$

In one approach, if only $\theta_2^{(1)}$ and $\theta_3^{(1)}$ are used to perform CFO estimation, the residue error will not be satisfactory. To improve performance, the CFO estimation will rely on the output from the second FD, and the angle $\theta_2^{(1)}$ and $\theta_3^{(1)}$ will be used only as a reference. The details are described as follows.

The results from the second FD, $V_2^{(2)}$ and $V_3^{(2)}$, are processed in an arctan(·) function to calculate:

$$\hat{\theta}_i^{(2a)} = \arctan[\Im(V_i^{(2)})/\Re(V_i^{(2)})] \in [-\pi, \pi), i=2, 3.$$

However, since the delay of the second FD is $P_2 = 6 \times 165 = 990$, the largest possible value for $\hat{\theta}_i^{(2)}$ is:

$$2\pi \times (9240 \text{ MHz} \times 40 \text{ ppm}) \times (6 \times 165) \times (1/528 \text{ MHz}) = 249.48°$$

for BAND-12 (BG-4) with a total 40 ppm offset. In other words, the angle $\hat{\theta}_i^{(2a)}$ has $\pm 2\pi$ ambiguity and the competing candidates are:

$$\hat{\theta}_i^{(2b)} = \hat{\theta}_i^{(2a)} - \text{sign}[\hat{\theta}_i^{(2a)}] \times 2\pi, i=2, 3.$$

Thus, we have two competing versions of the averaged results:

$$\theta_2^{(2a)} = \frac{1}{2}\left[ \hat{\theta}_2^{(2a)} + \frac{\alpha_2 \cdot \hat{\theta}_3^{(2a)}}{\alpha_3} \right], \theta_3^{(2a)} = \frac{1}{2}\left[ \frac{\alpha_3 \cdot \hat{\theta}_2^{(2a)}}{\alpha_2} + \hat{\theta}_3^{(2a)} \right]$$

and $$\theta_2^{(2b)} = \frac{1}{2}\left[ \hat{\theta}_2^{(2b)} + \frac{\alpha_2 \cdot \hat{\theta}_3^{(2b)}}{\alpha_3} \right], \theta_3^{(2b)} = \frac{1}{2}\left[ \frac{\alpha_3 \cdot \hat{\theta}_2^{(2b)}}{\alpha_2} + \hat{\theta}_3^{(2b)} \right].$$

Now the reference angle $\theta_2^{(1)}$ (or $\theta_3^{(1)}$) can be used to make the selection according to the following test:

if $|\theta_2^{(2a)} - (P_2/P_1) \cdot \theta_2^{(1)}| < |\theta_2^{(2b)} - (P_2/P_1) \cdot \theta_2^{(1)}|$ $\theta_2^{(2)} = \theta_2^{(2a)}, \theta_3^{(2)} = \theta_3^{(2a)};$ else $\theta_2^{(2)} = \theta_2^{(2b)}, \theta_3^{(2)} = \theta_3^{(2b)}.$ The final estimate of the frequency offset is given by:

$$\hat{\delta} = \frac{1}{2\pi P_2 T_s F_0} \left[ \frac{\theta_2^{(2)}}{\alpha_2} \right]$$

or equivalently $$\hat{\delta} = \frac{1}{2\pi P_2 T_s F_0} \left[ \frac{\theta_3^{(2)}}{\alpha_3} \right]$$

and the CFO estimates for each of the three bands are given by:

$$\Delta \hat{F}_i = \delta \alpha_i F_0, i=1, 2, 3$$

The phase error per sample is:

$$\omega_1 = \frac{\alpha_1}{\alpha_2} \cdot \frac{\theta_2^{(2)}}{P_2}, \omega_2 = \frac{\theta_2^{(2)}}{P_2}, \omega_3 = \frac{\theta_3^{(2)}}{P_2}.$$

Finally, the phase error is sent to a phase rotator to correct for any frequency errors.

Figure 20:
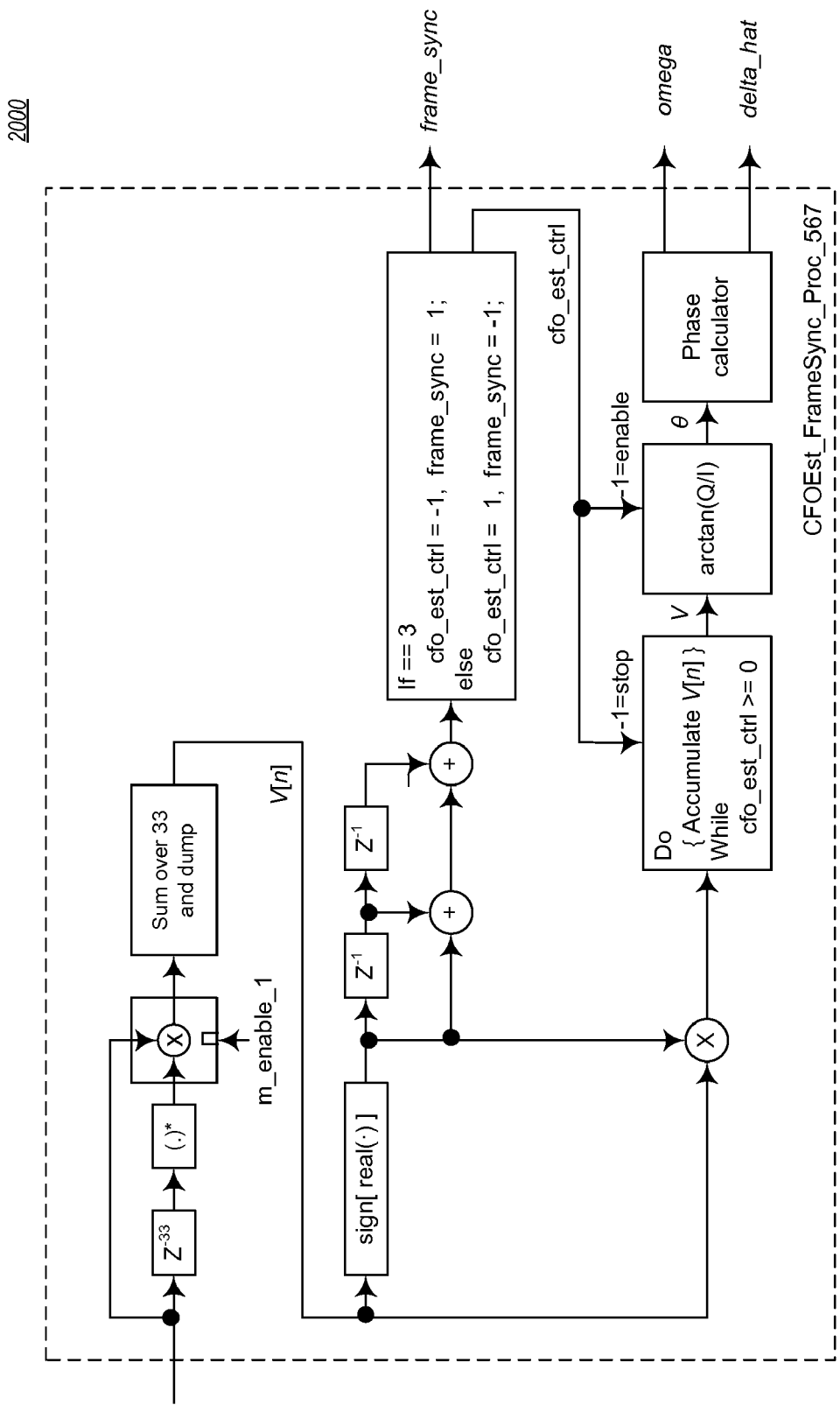
FIG. 20 is a block diagram of a CFO estimation and frame synchronization processor for TFC-5, TFC-6 and TFC-7.

FIG. 20 illustrates an exemplary CFO estimation and frame synchronization processor 2000 that implements the CFO estimation and frame synchronization processor 1630 for TFC-5, TFC-6 and TFC-7. As the operation of the processor is identical for TFC-5, TFC-6 and TFC-7, the description will focus on TFC-5 for simplicity of presentation Initially, frequency discrimination is determined by the cross-correlation between the outputs of MF 1506 of two contiguous preamble symbols:

$$Q[n, m] = f[(n+1), m]f^*[n, m] =$$
$$128 D_0 E_s (s_{cover}[n] \cdot s_{cover}[n+1])|h[m]|^2 \exp(j2\pi \cdot \Delta F \cdot PT_s) + w_{FD}$$

where P=165 is the delay. Note that the band index is dropped since there is no frequency hopping for TFC-, TFC-6 or TFC-7.

By accumulating 33 consecutive outputs from the first FD, what is obtained is:

$$V[n] = \sum_{m=0}^{32} Q[n, m_0 + m] = 128 D_0 E_s (s_{cover}[n] \cdot s_{cover}[n+1])$$
$$\left( \sum_{k=0}^{32} |h[m_0 + m]|^2 \right) \exp(j2\pi \cdot \Delta F \cdot PT_s) + w_{AC}$$

For the frame synchronization detection, the phase rotation in V[n] due to CFO is $2\pi\Delta F\, PT_s$, and it has as its largest possible value for BAND-14 (in BG-5) with a total 40 ppm offset:

$$\theta_{max} = 2\pi \times (10296\ \text{MHz} \times 40\ \text{ppm}) \times 165 \times (1/528\ \text{MHz}) = 46.33°$$

The value of $\theta_{max}$ indicates the following:

First, since $|\theta_{max}| < \pi$, it guarantees that for all BGs, there is no "$\pm 2n\pi$" ambiguity for CFO estimation, i.e., the estimated CFO is the total CFO, NOT the fractional.

Second, since $|\theta_{max}|$ takes values much less than $\pi/2$, it is possible to test the two hypotheses:
H0: CFO ($\theta$ only)
H1: CFO and cover sequence sign flipping ($\theta+\pi$)
by examining the variable V[n] only, even in the low SNR regime.

Figure 21:
FIG. 21 illustrates the operation of the frame synchronization detection for TFC-5, TFC-6 and TFC-7.

FIG. 21 illustrates a frame synchronization detection process 2100 for TFC-5, TFC-6 and TFC-7. The first row in the figure is the cover sequence, and the second row represents "sign[$\Re(V[n])$]". The signal "frame_sync=+1" is asserted when the unique pattern "−++" at the end is detected.

The CFO estimation and frame synchronization processor 2000 also performs CFO estimation. During CFO estimation, the FD output V[n] is accumulated:

$$V = \sum_{n=n_0} V[n] \cdot \text{sign}[\Re(V[n])]$$

where $n_0$ is the starting symbol index for the accumulation. The accumulation continues until the end of the cover sequence is detected (frame_sync=+1, or cfo_est_ctrl=−1). Then V will be sent to the arctan(·) computer to calculate the angle:

$$\hat{\theta} = \arctan[\Im(V)/\Re(V)] \in [-\pi, \pi),$$

and the estimate of the frequency offset can be calculated as:

$$\hat{\delta} = \frac{\hat{\theta}}{2\pi PT_s F}$$

where F is the center frequency. The phase error per sample is:

$$\omega = \hat{\theta}/P.$$

Finally, the phase error is sent to a phase rotator to correct any frequency errors.

Figure 22:
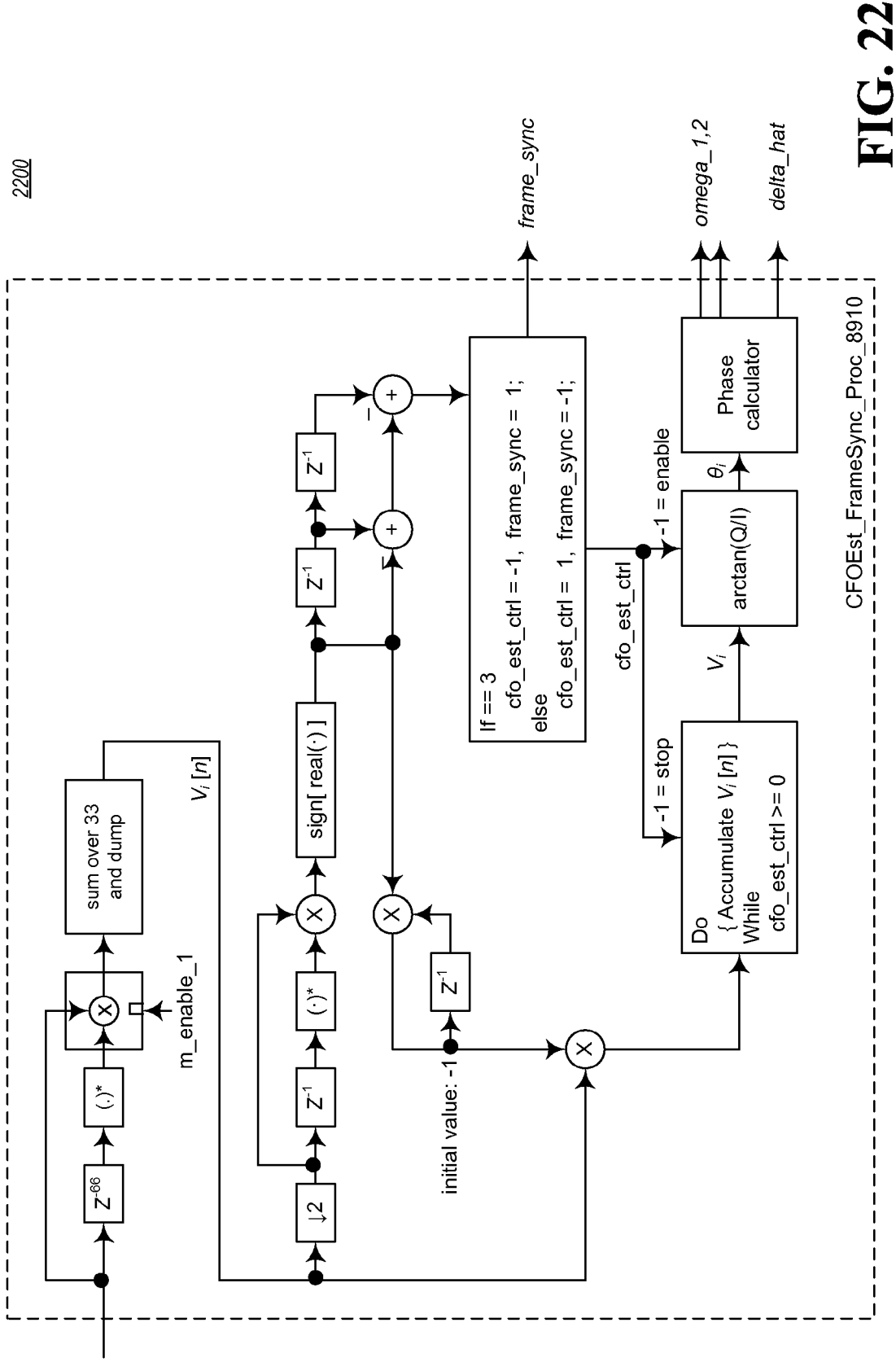
FIG. 22 is a block diagram of a CFO estimation and frame synchronization processor for TFC-8, TFC-9 and TFC-10.

FIG. 22 shows an exemplary CFO estimation and frame sync processor for TFC-8, TFC-9, and TFC-10. Since the algorithm is identical for all the three TFCs, the discussion will focus on TFC-8 for succinctness of presentation.

Initially, frequency discrimination is determined by the cross-correlation between the outputs of MF 1506 of two consecutive preamble symbols in the same band:

$$Q_i[n, m] = f_i[(n+1), m]f_i^*[n, m] =$$
$$128 D_0 E_s (s_{cover}[2n+i-1] \cdot s_{cover}[2(n+1)+i-1]) \cdot |h_i[m]|^2$$
$$\exp(j2\pi \cdot \Delta F_i \cdot PT_s) + w_{FD},$$
$$n = 0, 1, \ldots, 10;$$
$$i = 1, 2$$

where $f_i[n,m]$ and $f_i[(n+1),m]$ are the m th output from the MF, for the n th and (n+1)th preamble symbol in Band-i; and P=2×165=330 is the delay.

By accumulating 33 consecutive FD outputs, what is obtained is:

$$V_i[n] = \sum_{m=0}^{32} Q_i[n, m_0 + m] =$$
$$128 D_0 E_s (s_{cover}[2n+i-1] \cdot s_{cover}[2(n+1)+i-1]) \cdot \left( \sum_{k=0}^{32} |h_i[m_0 + m]|^2 \right)$$
$$\exp(j2\pi \cdot \Delta F_i \cdot PT_s) + w_{AC}$$

where $w_{AC}$ is the noise term from the accumulation, and $m_0$ is the starting index obtained by timing estimation. Note that $m_0$ is initially found to maximize the total collected channel energy $$\sum_{k=0}^{32} |h_1[m_0 + m]|^2$$

for Band-1, but applied to Band-2 with negligible loss.

For frame synchronization detection, the phase rotation due to CFO is $2\pi\Delta F_i PT_s$, and it takes its largest possible value for BAND-14 (in BG-5) with a total 40 ppm offset:

$$\theta_{max}=2\pi\times(10296\text{ MHz}\times 40\text{ ppm})\times(2\times 165)\times(1/528\text{ MHz})=92.66°$$

The value of $\theta_{max}$ indicates the following:

First, since $|\theta_{max}|<\pi$, it guarantees that for all BGs, there is no "$\pm 2n\pi$" ambiguity for CFO estimation, i.e., the estimated CFO is the total CFO, NOT the fractional.

Second, since $|\theta_{max}|$ may take values greater than $\pi/2$, it is not sufficient to test the two hypotheses:

H0: CFO ($\theta$ only)

H1: CFO and cover sequence sign flipping ($\theta+\pi$)

by examining the variable $V_i[n]$ only, even in a noise-free scenario.

Figure 23:
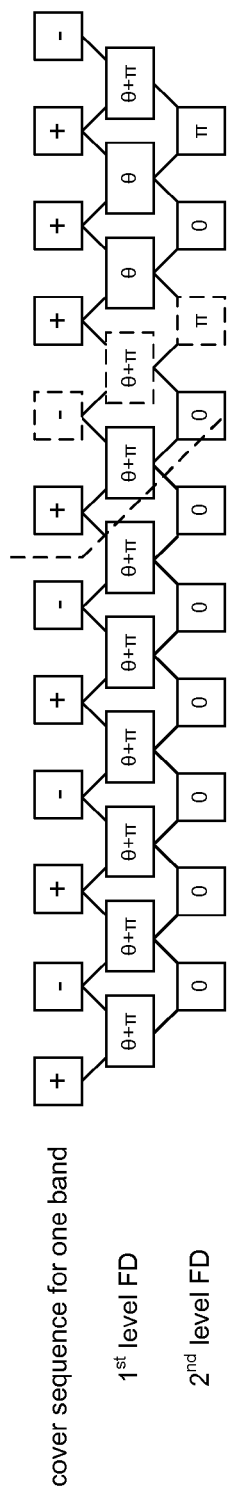
FIG. 23 illustrates the operation of the frame synchronization detection for TFC-8, TFC-9 and TFC-10.

To successfully detect the sign flipping, a second-level frequency discriminator is implemented:

$$Z_i[n]=V_i[n+1]\cdot(V_i[n])^*, n=0, 1, \ldots, 9,$$

and the process is illustrated in a frame synchronization detection process 2300 in FIG. 23. The first row represents the cover sequence for any one of the two bands (note that the cover sequences for Band-1 and Band-2 are identical). The second row shows the phase associated with the first-level FD outputs (note the ambiguity between $\theta$ and $\theta+\pi$ for high BGs). The third row shows the phase associated with the second-level FD outputs. The dashed line indicates the starting point of CFO estimation according to the timeline in FIG. 14.

The frame synchronization detection process 2300 operates as follows. Because the cover sequence is identical for Band-1 and Band-2, either one may be chosen for this purpose and the other channel index i may be dropped for frame synchronization detection. It is assumed that the CFO estimation will start no later than symbol-15 in Band-1 (or symbol-16 in Band-2), such that the second-level FD will not miss the first "$\pi$". Then the system will detect the following two phase rotation "0" and "$\pi$" by:

$\pi$: sign$[\Re(Z[n])]=-1$

0: sign$[\Re(Z[n])]=+1$

Once the unique pattern "$\pi$-0-$\pi$" is detected, the signal frame_sync=+1 is asserted and the receiver is switched to the channel estimation mode.

For CFO estimation, as shown in FIG. 23, the phase associated with the first-level FD can be in either of the two states, $\theta$ or $\theta+\pi$. If state[n] is defined as the state of $V_i[n]$:

$$\text{state}[n] = \begin{cases} +1, & \text{if angle}(V_i[n]) = \theta \\ -1, & \text{if angle}(V_i[n]) = \theta + \pi \end{cases}.$$

For each of the two bands, the first-level FD output $V_i[n]$ is accumulated:

$$V_i = \sum_{n=n_i} V_i[n]\cdot\text{state}[n],$$

$$i = 1, 2$$

where $n_i$ is the starting symbol index for the accumulation in Band-i. Because the state transition happens when the phase of the second-level FD is $\pi$, the state of $V_i[n]$ can be updated as:

```
state[n₀] = −1; n = n₀;
Do
{   n = n + 1;
    state[n] = state[n − 1]·sign[ℜ(Z_i[n − 1])];
}
while frame__sync ≠ +1
```

Once frame_sync=+1 is asserted, the receiver sets the signal cfo_est_ctrl=−1 to stop the accumulation and $V_i$ will be processed by an arctan($\cdot$) function to calculate the angle:

$$\hat{\theta}_i=\arctan[\Im(V_i)/\Re(V_i)]\in[-\pi,\pi), i=1, 2$$

The estimate of the frequency offset can be calculated as:

$$\hat{\delta} = \frac{1}{2}\cdot\frac{1}{2\pi PT_s F_0}\left[\frac{\hat{\theta}_1}{\alpha_1}+\frac{\hat{\theta}_2}{\alpha_2}\right],$$

where $F_0$=4224 MHz is the base oscillator frequency, and the coefficients $\alpha_i$ are defined as the ratio between the center frequency $F_i$ to the base frequency $F_0$:

$$\alpha_i=F_i/F_0, i=1, 2.$$

The final estimates of the frequency error for each of the two bands are given by:

$$\Delta\hat{F}_i=\hat{\delta}\alpha_i F_0, i=1, 2$$

and the phase error per sample is:

$$\omega_i = 2\pi\cdot\Delta\hat{F}_i\cdot T_s = \frac{\alpha_i}{2P}\left[\frac{\hat{\theta}_1}{\alpha_1}+\frac{\hat{\theta}_2}{\alpha_2}\right], i = 1, 2.$$

Finally, the phase error is sent to a phase rotator to correct for any frequency errors.

It is to be understood that the embodiments described herein may be implemented by hardware, software, firmware, middleware, microcode, or any combination thereof. When the systems and/or methods are implemented in software, firmware, middleware or microcode, program code or code segments, they may be stored in a machine-readable medium, such as a storage component. A code segment may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted using any suitable means including memory sharing, message passing, token passing, network transmission, etc.

For a software implementation, the techniques described herein may be implemented with modules (e.g., procedures, functions, and so on) that perform the functions described herein. The software codes may be stored in memory units and executed by processors. The memory unit may be implemented within the processor or external to the processor, in which case it can be communicatively coupled to the processor through various means as is known in the art.

What has been described above includes examples of one or more embodiments. It is, of course, not possible to describe every conceivable combination of components or methodologies for purposes of describing the aforementioned embodiments, but one of ordinary skill in the art may recognize that many further combinations and permutations of various embodiments are possible. Accordingly, the described embodiments are intended to embrace all such alterations, modifications and variations that fall within the spirit and scope of the appended claims. Furthermore, to the extent that the term "includes" is used in either the detailed description or the claims, such term is intended to be inclusive in a manner similar to the term "comprising" as "comprising" is interpreted when employed as a transitional word in a claim.

What is claimed is:

1. A method for performing a combined carrier frequency offset estimation and frame synchronization comprising:
    performing by synchronizer circuitry a first level frequency discrimination on at least one estimated channel tap to generate a frequency discriminated value;
    estimating by the synchronizer circuitry, a phase error from the frequency discriminated value;
    determining by the synchronizer circuitry, a predetermined frame synchronization pattern from the estimated phase error; and
    performing by the synchronizer circuitry, an enhanced first level frequency discrimination on the at least one estimated channel tap to generate an enhanced first level frequency discriminated value, the at least one estimated channel tap being delayed by a predetermined amount of time,
    wherein estimating the phase error comprises estimating the phase error from the frequency discriminated value and the enhanced first level frequency discriminated value.

2. The method of claim 1, wherein the predetermined frame synchronization pattern comprises a sequence of alternating signs.

3. The method of claim 1, wherein the estimated phase error is proportional to an estimated frequency error.

4. The method of claim 1, further comprising performing by the synchronizer circuitry, an enhanced second level frequency discrimination on the at least one estimated channel tap to generate an enhanced second level frequency discriminated value.

5. The method of claim 1, further comprising performing by the synchronizer circuitry, a weighted average calculation of an estimated carrier frequency offset.

6. An apparatus for performing a combined carrier frequency offset estimation and frame synchronization comprising:
    hardware means for performing a first level frequency discrimination on at least one estimated channel tap to generate a frequency discriminated value;
    hardware means for estimating a phase error from the frequency discriminated value;
    hardware means for determining a predetermined frame synchronization pattern from the estimated phase error; and
    hardware means for performing an enhanced first level frequency discrimination on the at least one estimated channel tap to generate an enhanced first level frequency discriminated value, wherein the at least one estimated channel tap is delayed by a predetermined amount of time, and
        wherein the hardware means for estimating the phase error comprises hardware means for estimating the phase error from the frequency discriminated value and the enhanced first level frequency discriminated value.

7. The apparatus of claim 6, wherein the predetermined frame synchronization pattern comprises a sequence of alternating signs.

8. The apparatus of claim 6, wherein the estimated phase error is proportional to an estimated frequency error.

9. The apparatus of claim 6, further comprising hardware means for performing an enhanced second level frequency discrimination on the at least one estimated channel tap to generate an enhanced second level frequency discriminated value.

10. The apparatus of claim 6, further comprising hardware means for performing a weighted average calculation of an estimated carrier frequency offset.

11. A wireless communications apparatus comprising:
    an antenna;
    a receiver coupled to the antenna, the receiver having a circuit configured to perform a method for performing a combined carrier frequency offset estimation and frame synchronization, the method comprising:
        performing a first level frequency discrimination on at least one estimated channel tap to generate a frequency discriminated value;
        estimating a phase error from the frequency discriminated value;
        determining a predetermined frame synchronization pattern from the estimated phase error; and
        performing an enhanced first level frequency discrimination on the at least one estimated channel tap to generate an enhanced first level frequency discriminated value, the at least one estimated channel tap being delayed by a predetermined amount of time,
        wherein estimating the phase error comprises estimating the phase error from the frequency discriminated value and the enhanced first level frequency discriminated value.

12. The wireless communications apparatus of claim 11, wherein the predetermined frame synchronization pattern comprises a sequence of alternating signs.

13. The wireless communications apparatus of claim 11, wherein the estimated phase error is proportional to an estimated frequency error.

14. The wireless communications apparatus of claim 11, wherein the method further comprises performing an enhanced second level frequency discrimination on the at least one estimated channel tap to generate an enhanced second level frequency discriminated value.

15. The wireless communications apparatus of claim 11, wherein the method further comprises performing a weighted average calculation of an estimated carrier frequency offset.

16. A computer program product, comprising:
    a non-transitory computer-readable medium comprising:
        code for causing a computer to perform a first level frequency discrimination on at least one estimated channel tap to generate a frequency discriminated value;
        code for causing the computer to estimate a phase error from the frequency discriminated value;
        code for causing the computer to determine a predetermined frame synchronization pattern from the estimated phase error; and
        code for performing an enhanced first level frequency discrimination on the at least one estimated channel tap to generate an enhanced first level frequency discriminated value, the at least one estimated channel tap being delayed by a predetermined amount of time, wherein estimating the phase error comprises estimating the phase error from the frequency discriminated value and the enhanced first level frequency discriminated value.

17. A processor, comprising:
a memory, the memory configured to cause the processor to implement a method for performing a combined carrier frequency offset estimation and frame synchronization, the method comprising:
   performing a first level frequency discrimination on at least one estimated channel tap to generate a frequency discriminated value;
   estimating a phase error from the frequency discriminated value;
   determining a predetermined frame synchronization pattern from the estimated phase error; and
   performing an enhanced first level frequency discrimination on the at least one estimated channel tap to generate an enhanced first level frequency discriminated value, the at least one estimated channel tap being delayed by a predetermined amount of time, and
   wherein estimating the phase error comprises estimating the phase error from the frequency discriminated value and the enhanced first level frequency discriminated value.

18. A method for performing a combined carrier frequency offset estimation and frame synchronization comprising:
   performing by synchronizer circuitry a first level frequency discrimination on at least one estimated channel tap to generate a frequency discriminated value;
   estimating by the synchronizer circuitry, a phase error from the frequency discriminated value;
   determining by the synchronizer circuitry, a predetermined frame synchronization pattern from the estimated phase error;
   performing by the synchronizer circuitry, an enhanced first level frequency discrimination on the at least one estimated channel tap to generate an enhanced first level frequency discriminated value, the at least one estimated channel tap being delayed by a predetermined amount of time; and
   performing by the synchronizer circuitry, an enhanced second level frequency discrimination on the at least one estimated channel tap to generate an enhanced second level frequency discriminated value.

19. A wireless communications apparatus comprising:
an antenna;
a receiver coupled to the antenna, the receiver having a circuit configured to perform a method for performing a combined carrier frequency offset estimation and frame synchronization, the method comprising:
   performing a first level frequency discrimination on at least one estimated channel tap to generate a frequency discriminated value;
   estimating a phase error from the frequency discriminated value;
   determining a predetermined frame synchronization pattern from the estimated phase error;
   performing an enhanced first level frequency discrimination on the at least one estimated channel tap to generate an enhanced first level frequency discriminated value, the at least one estimated channel tap being delayed by a predetermined amount of time; and
   performing an enhanced second level frequency discrimination on the at least one estimated channel tap to generate an enhanced second level frequency discriminated value.

20. A processor, comprising:
a memory, the memory configured to cause the processor to implement a method for performing a combined carrier frequency offset estimation and frame synchronization, the method comprising:
   performing a first level frequency discrimination on at least one estimated channel tap to generate a frequency discriminated value;
   estimating a phase error from the frequency discriminated value;
   determining a predetermined frame synchronization pattern from the estimated phase error;
   performing an enhanced first level frequency discrimination on the at least one estimated channel tap to generate an enhanced first level frequency discriminated value, the at least one estimated channel tap being delayed by a predetermined amount of time; and
   performing an enhanced second level frequency discrimination on the at least one estimated channel tap to generate an enhanced second level frequency discriminated value.

* * * * *